(12) United States Patent
Liu et al.

(10) Patent No.: US 11,716,706 B2
(45) Date of Patent: Aug. 1, 2023

(54) METHOD AND DEVICE IN NODE FOR WIRELESS COMMUNICATION

(71) Applicants: Jin Liu, Shanghai (CN); Xiaobo Zhang, Shanghai (CN)

(72) Inventors: Jin Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 494 days.

(21) Appl. No.: 16/919,087

(22) Filed: Jul. 1, 2020

(65) Prior Publication Data
US 2021/0014830 A1 Jan. 14, 2021

(30) Foreign Application Priority Data
Jul. 8, 2019 (CN) .......................... 201910610969.3

(51) Int. Cl.
*H04W 72/02* (2009.01)
*H04W 72/0446* (2023.01)
(Continued)

(52) U.S. Cl.
CPC ............. *H04W 72/02* (2013.01); *H04W 4/40* (2018.02); *H04W 72/0446* (2013.01); *H04W 72/0453* (2013.01); *H04W 92/18* (2013.01)

(58) Field of Classification Search
CPC ... H04W 4/40; H04W 72/02; H04W 72/0446; H04W 72/0453; H04W 92/18
See application file for complete search history.

(56) References Cited

U.S. PATENT DOCUMENTS

| 2007/0217362 A1 | 9/2007 | Kashima | |
| 2021/0176747 A1* | 6/2021 | Yang | ..................... H04L 5/0094 |
| 2022/0123915 A1* | 4/2022 | Yoshioka | .................. H04L 5/14 |

FOREIGN PATENT DOCUMENTS

| CN | 107801247 A | 3/2018 |
| CN | 107819714 A | 3/2018 |

(Continued)

OTHER PUBLICATIONS

"R1-1712742 Discussionon time domain resource allocation final" 3GPP tsg ran wg1_rl1 Aug. 11, 2017.
(Continued)

*Primary Examiner* — Brian P Cox

(57) ABSTRACT

The present disclosure method and device in node used for wireless communication. A first node receives first information, the first information being used for indicating a first time-unit format; determines second information; and determines a first resource pool; herein, a first time window comprises Q first-type time-domain-resource blocks, the Q being a positive integer greater than 1; a first symbol is one of the positive integer number of multicarrier symbol(s) comprised in any of the Q first-type time-domain-resource blocks; the first time-unit format is used for indicating whether the first symbol is a first-type symbol; the second information is used for indicating a positive integer number of first-type time-domain-resource block(s) out of a first time-domain-resource-block subset. A flexible slot format has been taken into account in the process of V2X resource pool configuration in the present disclosure, thus ensuring that the resource pool can effectively meet traffic requirements.

14 Claims, 17 Drawing Sheets

(51) Int. Cl.
*H04W 4/40* (2018.01)
*H04W 72/0453* (2023.01)
*H04W 92/18* (2009.01)

(56) References Cited

FOREIGN PATENT DOCUMENTS

| CN | 108401298 A | 8/2018 |
| CN | 109802778 A | 5/2019 |
| CN | 109963341 A | 7/2019 |

OTHER PUBLICATIONS

CN201910610969.3 First Office Action dated Apr. 1, 2022.
CN201910610969.3 First Search Report dated Mar. 28, 2022.

\* cited by examiner

Time-unit-format list

| Format index | Symbol number | | | | | |
|---|---|---|---|---|---|---|
| | 0 | 1 | 2 | 3 | ...... | T-1 |
| 0 | D | D | D | D | ...... | D |
| 1 | U | U | U | U | ...... | U |
| 2 | F | F | F | F | ...... | F |
| . | . | . | . | . | ...... | . |
| . | . | . | . | . | First time unit format | . |
| First format index | D | D | F | U | ...... | U |
| . | . | . | . | . | ...... | . |
| . | . | . | . | . | ...... | . |

Time unit format subset

Case A

First-type symbol     Second-type symbol     Second-type symbol

Case B

First-type symbol     First-type symbol     Second-type symbol

METHOD AND DEVICE IN NODE FOR WIRELESS COMMUNICATION

CROSS REFERENCE TO RELATED APPLICATIONS

This application claims the priority benefit of Chinese Patent Application No. 201910610969.3, filed Jul. 8, 2019, the full disclosure of which is incorporated herein by reference.

BACKGROUND

Technical Field

The present disclosure relates to transmission methods and devices in wireless communication systems, and in particular to a transmission scheme and a device relevant to sidelink in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPPRAN #80 Plenary Session, the technical Study Item (SI) of NR V2X was initialized, and later at the first AdHoc conference of RAN1 2019 it was generally agreed that the pathloss between a transmitter and a receiver in a V2X pair shall be taken as reference for the V2X transmitting power.

SUMMARY

There are several transmission formats of subframes in conventional LTE/LTE-Advanced system, wherein uplink and downlink ratios of each subframe are relatively fixed. But in NR system, uplink and downlink ratios of each slot are relatively flexible, and even a flexible symbol is introduced, which can be used as an uplink or a downlink. However, for near field communications like V2X, uplink resources are generally adopted; too flexible uplink and downlink ratios result in that some resources with uplink symbols are still not suitable for V2X communications.

To solve the above problem, the present disclosure provides a scheme for a sidelink resource pool configuration, which effectively solves the problem of effective utilization of flexible slot formats in V2X system. It should be noted that the embodiments of a User Equipment (UE) in the present disclosure and the characteristics of the embodiments may be applied to a base station if no conflict is incurred, and vice versa. The embodiments of the present disclosure and the characteristics of the embodiments may be mutually combined if no conflict is incurred. Further, although the original intention of the present disclosure is for single-carrier communications, the present disclosure can also be used for multicarrier communications. Further, although the original intention of the present disclosure is for single-antenna communications, the present disclosure can also be used for multi-antenna communications.

In one embodiment, terminologies in the present disclosure is interpreted with reference to a definition of 3GPP specification protocol TS36 series.

In one embodiment, terminologies in the present disclosure is interpreted with reference to a definition of 3GPP specification protocol TS38 series.

In one embodiment, terminologies in the present disclosure is interpreted with reference to a definition of 3GPP specification protocol TS37 series.

In one embodiment, terminologies in the present disclosure is interpreted with reference to a definition of specialization protocol of Institute of Electrical and Electronics Engineers.

The present disclosure provides a method in a first node for wireless communications, comprising:

receiving first information, the first information being used to indicate a first time-unit format;

determining second information; and determining a first resource pool;

wherein a first time window comprises Q first-type time-domain-resource blocks, Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first time-unit format is used for indicating whether the first symbol is a first-type symbol; the second information is used for indicating a positive integer number of first-type time-domain-resource block(s) out of a first time-domain-resource-block subset, the first time-domain-resource-block subset comprises a positive integer number of first-type time-domain-resource block(s) among the Q first-type time-domain-resource blocks; the first resource pool comprises a positive integer number of first-type time-domain-resource block(s) among the first time-domain-resource-block subset in time domain, and the first time-unit format and the second information are jointly used for determining the first resource pool.

In one embodiment, a problem needed to be solved in the present disclosure is the problem of V2X resource pool configuration incurred by a flexible slot format.

In one embodiment, a method in the present disclosure, wherein the first time-unit format and the second information are jointly used for determining the first resource pool.

In one embodiment, the above method is characterized in that the first time-unit format is introduced to determine the first resource pool.

In one embodiment, the above method is characterized in that the first time-unit format is connected with the second information.

In one embodiment, the above method is advantageous in that slots with fewer uplink symbols are excluded from the V2X resource pool, thus ensuring that the V2X resource pool can meet V2X traffic requirements.

According to one aspect of the present disclosure, the above method is characterized in comprising:

determining whether a first candidate time-domain-resource block belongs to the first time-domain-resource-block subset;

wherein the first candidate time-domain-resource block is one of the Q first-type time-domain-resource blocks; the first time-unit format is used for determining whether the first candidate time-domain-resource block belongs to the first time-domain-resource-block subset.

According to one aspect of the present disclosure, the above method is characterized in that a time-unit-format list comprises a positive integer number of first-type time-unit format(s), the first time-unit format is a first-type time-unit format among the time-unit-format list, and a time-unit-format subset comprises a positive integer number of first-type time-unit format(s) among the time-unit-format list; when the first time-unit format belongs to the time-unit-format subset, the first candidate time-domain-resource block does not belong to the first time-domain-resource-block sub set.

According to one aspect of the present disclosure, the above method is characterized in that the first time-unit format is used for indicating X1 multicarrier symbol(s) comprised in the first candidate time-domain-resource block, the X1 multicarrier symbol(s) all being the first-type symbol(s), the X1 being a non-negative integer; when the X1 is less than a first threshold, the first candidate time-domain-resource block does not belong to the first time-domain-resource-block sub set.

According to one aspect of the present disclosure, the above method is characterized in comprising:
determining whether the first candidate time-domain-resource block belongs to the first resource pool;
wherein the first candidate time-domain-resource block belongs to the first time-domain-resource-block subset; the second information comprises a first bit, which corresponds to the first candidate time-domain-resource block and is used for determining whether the first candidate time-domain-resource block belongs to the first resource pool.

According to one aspect of the present disclosure, the above method is characterized in comprising:
determining whether a second candidate time-domain-resource block belongs to the first resource pool;
wherein the second candidate time-domain-resource block is a first-type time-domain-resource block among the first time-domain-resource-block subset; the second information comprises a second bit, which corresponds to the second candidate time-domain-resource block; the first time-unit format is used for indicating X2 multicarrier symbol(s) comprised in the second candidate time-domain-resource block, the X2 multicarrier symbol(s) all being the first-type symbol(s), X2 being a non-negative integer; when a value of the second bit is a first value and the X2 is not less than the first threshold, the second candidate time-domain-resource block belongs to the first resource pool.

According to one aspect of the present disclosure, the above method is characterized in comprising:
determining whether a second candidate time-domain-resource block belongs to the first resource pool;
wherein the second candidate time-domain-resource block is a first-type time-domain-resource block among the first time-domain-resource-block subset; the second information comprises a second bit, which corresponds to the second candidate time-domain-resource block; a time-unit-format list comprises a positive integer number of first-type time-unit format(s), the first time-unit format is a first-type time-unit format among the time-unit-format list, and a time-unit-format subset comprises a positive integer number of first-type time-unit format(s) in the time-unit-format list; when a value of the second bit is a first value and the first time-unit format does not belong to the time-unit-format subset, the second candidate time-domain-resource block belongs to the first resource pool.

According to one aspect of the present disclosure, the above method is characterized in comprising:
determining a first time-frequency-resource block in the first resource pool;
transmitting a first signal in the first time-frequency-resource block;
wherein the first resource pool comprises the first time-frequency-resource block.

According to one aspect of the present disclosure, the above method is characterized in that the first node is a UE.

According to one aspect of the present disclosure, the above method is characterized in that the first node is a base station.

According to one aspect of the present disclosure, the above method is characterized in that the first node is a relay node.

The present disclosure provides a method in a second node for wireless communications, comprising:
transmitting first information, the first information being used for indicating a first time-unit format;
wherein a first time window comprises Q first-type time-domain-resource blocks, Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first time-unit format is used for indicating whether the first symbol is a first-type symbol; the second information is determined by a receiver of the first information, and the second information is used for indicating a positive integer number of first-type time-domain-resource block(s) out of a first time-domain-resource-block subset; the first time-domain-resource-block subset comprises a positive integer number of first-type time-domain-resource block(s) among the Q first-type time-domain-resource blocks; a first resource pool comprises a positive integer number of first-type time-domain-resource block(s) among the first time-domain-resource-block subset in time domain, and the first time-unit format and the second information are jointly used for determining the first resource pool.

According to one aspect of the present disclosure, the above method is characterized in that a first candidate time-domain-resource block is one of the Q first-type time-domain-resource blocks; the first time-unit format is used for determining whether the first candidate time-domain-resource block belongs to the first time-domain-resource-block subset.

According to one aspect of the present disclosure, the above method is characterized in that a time-unit-format list comprises a positive integer number of first-type time-unit format(s), the first time-unit format is a first-type time-unit format among the time-unit-format list, and a time-unit-format subset comprises a positive integer number of first-type time-unit format(s) among the time-unit-format list; when the first time-unit format belongs to the time-unit-format subset, the first candidate time-domain-resource block does not belong to the first time-domain-resource-block sub set.

According to one aspect of the present disclosure, the above method is characterized in that the first time-unit format is used for indicating X1 multicarrier symbol(s) comprised in the first candidate time-domain-resource block, the X1 multicarrier symbol(s) all being the first-type symbol(s), the X1 being a non-negative integer; when the X1 is less than a first threshold, the first candidate time-domain-resource block does not belong to the first time-domain-resource-block sub set.

According to one aspect of the present disclosure, the above method is characterized in that the first candidate time-domain-resource block belongs to the first time-domain-resource-block subset; the second information comprises a first bit, which corresponds to the first candidate time-domain-resource block and is used for determining whether the first candidate time-domain-resource block belongs to the first resource pool.

According to one aspect of the present disclosure, the above method is characterized in that a second candidate time-domain-resource block is a first-type time-domain-resource block among the first time-domain-resource-block subset; the second information comprises a second bit, which corresponds to the second candidate time-domain-resource block; the first time-unit format is used for indicating X2 multicarrier symbol(s) comprised in the second candidate time-domain-resource block, the X2 multicarrier symbol(s) all being the first-type symbol(s), X2 being a non-negative integer; when a value of the second bit is a first value and the X2 is not less than the first threshold, the second candidate time-domain-resource block belongs to the first resource pool.

According to one aspect of the present disclosure, the above method is characterized in that a second candidate time-domain-resource block is a first-type time-domain-resource block in the first time-domain-resource-block subset; the second information comprises a second bit, which corresponds to the second candidate time-domain-resource block; a time-unit-format list comprises a positive integer number of first-type time-unit format(s), the first time-unit format is a first-type time-unit format among the time-unit-format list, and a time-unit-format subset comprises a positive integer number of first-type time-unit format(s) among the time-unit-format list; when a value of the second bit is a first value and the first time-unit format does not belong to the time-unit-format subset, the second candidate time-domain-resource block belongs to the first resource pool.

According to one aspect of the present disclosure, the above method is characterized in comprising:

receiving a first signal in the first time-frequency-resource block;

wherein the first resource pool comprises the first time-frequency-resource block.

According to one aspect of the present disclosure, the above method is characterized in that the second node is a UE.

According to one aspect of the present disclosure, the above method is characterized in that the second node is a base station.

According to one aspect of the present disclosure, the above method is characterized in that the second node is a relay node.

The present disclosure provides a first node for wireless communications, comprising:

a first receiver, receiving first information, the first information being used to indicate a first time-unit format;

a second receiver, determining second information; and the second receiver, determining a first resource pool;

wherein a first time window comprises Q first-type time-domain-resource blocks, Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first time-unit format is used for indicating whether the first symbol is a first-type symbol; the second information is used for indicating a positive integer number of first-type time-domain-resource block(s) out of a first time-domain-resource-block subset, the first time-domain-resource-block subset comprises a positive integer number of first-type time-domain-resource block(s) among the Q first-type time-domain-resource blocks; the first resource pool comprises a positive integer number of first-type time-domain-resource block(s) among the first time-domain-resource-block subset in time domain, and the first time-unit format and the second information are jointly used for determining the first resource pool.

The present disclosure provides a second node for wireless communications, comprising:

a second transmitter, transmitting first information, the first information being used to indicate a first time-unit format;

wherein a first time window comprises Q first-type time-domain-resource blocks, Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first time-unit format is used for indicating whether the first symbol is a first-type symbol; the second information is determined by a receiver of the first information, and the second information is used for indicating a positive integer number of first-type time-domain-resource block(s) out of a first time-domain-resource-block subset; the first time-domain-resource-block subset comprises a positive integer number of first-type time-domain-resource block(s) among the Q first-type time-domain-resource blocks; a first resource pool comprises a positive integer number of first-type time-domain-resource block(s) among the first time-domain-resource-block subset in time domain, and the first time-unit format and the second information are jointly used for determining the first resource pool.

In one embodiment, the present disclosure is advantageous in the following aspects:

the first time-unit format and the second information are jointly used for determining the first resource pool;

the first time-unit format is introduced to determine the first resource pool;

the first time-unit format is connected with the second information; and slots with fewer uplink symbols are excluded from the V2X resource pool, thus ensuring that the V2X resource pool can meet V2X traffic requirements.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
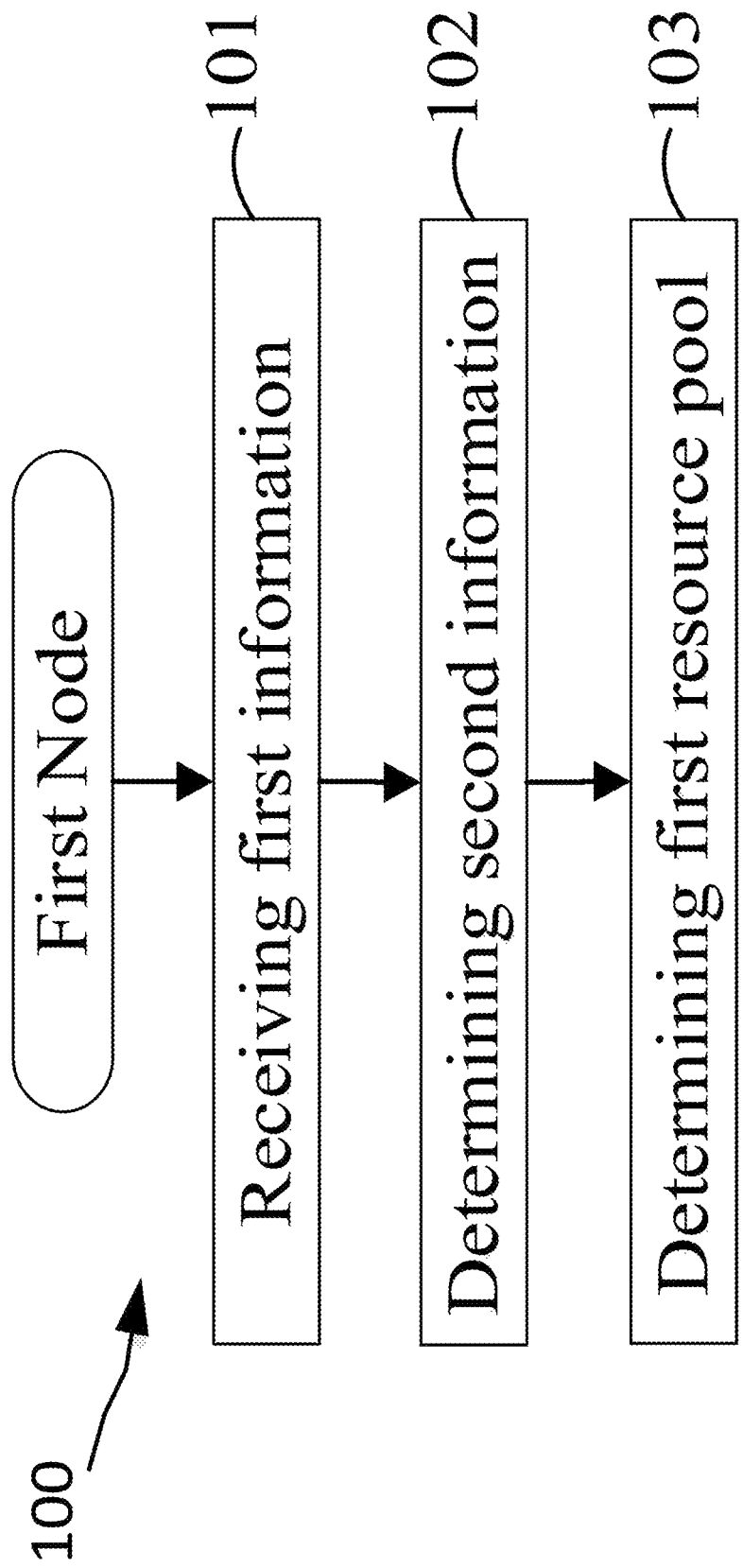
FIG. 1 illustrates a flowchart of the processing of a first node according to one embodiment of the present disclosure.

Embodiment 1 illustrates a flowchart of the processing of a first node according to one embodiment of the present disclosure, as shown in FIG. 1. In FIG. 1, each box represents a step. In Embodiment 1, a first node in the present disclosure first performs step S101, receiving first information; then step S102, determining second information; Finally step S103, determining a first resource pool; a first time window comprises Q first-type time-domain-resource blocks, Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first information is used for indicating a first time-unit format, and the first time-unit format is used for indicating whether the first symbol is a first-type symbol; the second information is used for indicating a positive integer number of first-type time-domain-resource block(s) out of a first time-domain-resource-block subset, the first time-domain-resource-block subset comprises a positive integer number of first-type time-domain-resource block(s) among the Q first-type time-domain-resource blocks; the first resource pool comprises a positive integer number of first-type time-domain-resource block(s) among the first time-domain-resource-block subset in time domain, and the first time-unit format and the second information are jointly used for determining the first resource pool.

In one embodiment, the first information comprises the first time-unit format.

In one embodiment, the first information directly indicates the first time-unit format.

In one embodiment, the first information indirectly indicates the first time-unit format.

In one embodiment, the first information is Broadcast.

In one embodiment, the first information is Groupcast.

In one embodiment, the first information is Unicast.

In one embodiment, the first information is Cell-specific.

In one embodiment, the first information is UE-specific.

In one embodiment, the first information is transmitted through a Downlink Shared Channel (DL-SCH).

In one embodiment, the first information is transmitted through a Sidelink Shared Channel (SL-SCH).

In one embodiment, the first information is transmitted through a Physical Downlink Control Channel (PDCCH).

In one embodiment, the first information is transmitted through a Physical Downlink Shared Channel (PDSCH).

In one embodiment, the first information is transmitted through a PDCCH and a PDSCH.

In one embodiment, the first information is transmitted through a Physical Sidelink Control Channel (PSCCH).

In one embodiment, the first information is transmitted through a Physical Sidelink Shared Channel (PSSCH).

In one embodiment, the first information is transmitted through a PSCCH and a PSSCH.

In one embodiment, the first information comprises all or part of a higher-layer signaling.

In one embodiment, the first information comprises all or part of a Radio Resource Control (RRC) layer signaling.

In one embodiment, the first information comprises one or more Fields of an RRC Information Element (IE).

In one embodiment, a definition of the RRC IE refers to 3GPP TS38.331.

In one embodiment, the first information comprises one or more fields of a SIB.

In one embodiment, the first information comprises all or part of a Multimedia Access Control (MAC) layer signaling.

In one embodiment, the first information comprises one or more fields of a MAC Control Element (CE).

In one embodiment, the first information comprises one or more fields of a Physical Layer (PHY) layer signaling.

In one embodiment, the first information comprises one or more fields of Sidelink Control Information (SCI).

In one embodiment, a definition of the SCI refers to 3GPP TS38. 212.

In one embodiment, the first information comprises one or more fields of Downlink Control Information (DCI).

In one embodiment, the first information is semi-statically configured.

In one embodiment, the first information is an RRC IE.

In one embodiment, the first information is dynamically configured.

In one embodiment, the first information is SCI.

In one embodiment, the first information is DCI.

In one embodiment, the first information comprises a parameter TDD-UL-DL-ConfigurationCommon.

In one embodiment, a definition of the parameter TDD-UL-DL-ConfigurationCommon refers to 3GPP TS38.331.

In one embodiment, the first information comprises a parameter TDD-UL-DL-ConfigDedicated.

In one embodiment, a definition of the parameter TDD-UL-DL-ConfigDedicated refers to 3GPP TS38.331.

In one embodiment, the first information comprises a parameter TTDD-UL-DL-Pattern.

In one embodiment, a definition of the parameter TDD-UL-DL-Pattern refers to 3GPP TS38.331, chapter 6.3.2.

In one embodiment, the first information comprises a slot format.

In one embodiment, the first information comprises a Slot Format Indicator (SFI).

In one embodiment, the first information comprises a second bitmap, which comprises a positive integer number of bits arranged in order, and the second bitmap corresponds to the first time-unit format.

In one embodiment, the second bitmap is used for indicating the first time-unit format.

In one embodiment, the positive integer number of bits arranged in order comprised in the second bitmap respectively correspond to a positive integer number of multicarriers comprised in a first time unit in the present disclosure.

In one embodiment, the first symbol is one of the positive integer number of multicarrier symbol(s) comprised in the first time unit, and a second bit is a bit corresponding to the first symbol in the second bitmap.

In one embodiment, when a value of the second bit is a third value, the first symbol is the first-type symbol.

In one embodiment, when a value of the second bit is a fourth value, the first symbol is not the first-type symbol.

In one embodiment, when a value of the second bit is a fourth value, the first symbol is the second-type symbol.

In one embodiment, the third value is 1.

In one embodiment, the fourth value is 0.

In one embodiment, the third value is a Boolean value "TRUE".

In one embodiment, the fourth value is a Boolean value "FALSE".

In one embodiment, the first information is used for indicating the first time-unit format out of a time-unit-format list in the present disclosure.

In one embodiment, the first information comprises an index of the first time-unit format in a time-unit-format list in the present disclosure.

In one embodiment, the first information comprises a configuration period of the first time-unit format.

In one embodiment, the first information comprises a number of first-type symbols comprised in the first time-unit format.

In one embodiment, the second information comprises a first bitmap.

In one embodiment, the second information directly indicates the first bitmap.

In one embodiment, the second information indirectly indicates the first bitmap.

In one embodiment, the second information is pre-defined.

In one embodiment, the second information is pre-configured.

In one embodiment, the second information is Broadcast.

In one embodiment, the second information is Groupcast.

In one embodiment, the second information is Unicast.

In one embodiment, the second information is Cell-specific.

In one embodiment, the second information is UE-specific.

In one embodiment, the second information is transmitted through a DL-SCH.

In one embodiment, the second information is transmitted through a SL-SCH.

In one embodiment, the second information is transmitted through a PDCCH.

In one embodiment, the second information is transmitted through a PDSCH.

In one embodiment, the second information is transmitted through a PDCCH and a PDSCH.

In one embodiment, the second information is transmitted through a PSCCH.

In one embodiment, the second information is transmitted through a PSSCH.

In one embodiment, the second information is transmitted through a PSCCH and a PSSCH.

In one embodiment, the second information comprises all or part of a higher-layer signaling.

In one embodiment, the second information comprises all or part of an RRC signaling.

In one embodiment, the second information comprises one or more fields of an RRC IE.

In one embodiment, the second information comprises one or more fields of a SIB.

In one embodiment, the second information comprises all or part of a MAC-layer signaling.

In one embodiment, the second information comprises one or more fields of a MAC CE.

In one embodiment, the second information comprises one or more fields of a PHY layer signaling.

In one embodiment, the second information comprises one or more fields of SCI.

In one embodiment, the second information comprises one or more fields of DCI.

In one embodiment, the second information is semi-statically configured.

In one embodiment, the second information is an RRC IE.

In one embodiment, the second information is dynamically configured.

In one embodiment, the second information is SCI.

In one embodiment, the second information is DCI.

In one embodiment, the second information is generated at a higher-layer of the first node.

In one embodiment, the second information is transmitted from a higher-layer of the first node to a physical layer of the first node.

In one embodiment, the determining second information comprises that a physical layer of the first node receives the second information from a higher-layer of the first node.

In one embodiment, the determining second information comprises that a physical layer of the first node receives the second information delivered from a higher-layer of the first node.

In one embodiment, the determining second information comprises that the second information obtained by the first node from a higher-layer signaling delivered by a higher layer of the first node.

In one embodiment, the determining second information comprises that a physical layer of the first node receives a higher-layer signaling transmitted by a higher layer of the first node, and obtains the second information from the received higher-layer signaling transmitted by a higher layer of the first node.

In one embodiment, the determining second information comprises that the first node obtains the second information from a received radio signal.

In one embodiment, the determining second information comprises that the first node receives a radio signal from an air interface, and obtains the second information from the radio signal received from the air interface.

In one embodiment, a transmitter of the first information and a transmitter of the second information are Non-Co-Located.

In one embodiment, a transmitter of the first information is a second node in the present disclosure, and a transmitter of the second information is the first node in the present disclosure.

In one embodiment, a transmitter of the first information is a second node in the present disclosure, and a transmitter of the second information is a communication node other than the second node and the first node.

In one embodiment, a transmitter of the first information is a UE, and a transmitter of the second information is a base station.

In one embodiment, a transmitter of the first information is a UE, and a transmitter of the second information is a relay.

In one embodiment, a transmitter of the first information is a relay, and a transmitter of the second information is a base station.

In one embodiment, a transmitter of the first information and a transmitter of the second information are respectively two different UEs.

In one embodiment, a Backhaul Link between a transmitter of the first information and a transmitter of the second information is non-ideal (that is, a delay cannot be ignored).

In one embodiment, a transmitter of the first information and a transmitter of the second information do not share a same set of BaseBand device.

In one embodiment, the first time-domain-resource-block subset comprises Q1 first-type time-domain-resource block(s), and any of the Q1 first-type time-domain-resource block(s) is one of Q first-type time-domain-resource blocks, the Q1 being a positive integer not greater than the Q.

In one embodiment, the first time-domain-resource-block subset comprises a first candidate time-domain resource pool, the first candidate time-domain-resource pool comprises Q2 first-type time-domain-resource block(s), and the first candidate time-domain-resource pool comprises the first resource pool, the Q2 being a positive integer not greater than the Q1.

In one embodiment, a first candidate time-domain-resource pool is indicated by the second information out of the first time-domain-resource-block subset, the first candidate time-domain-resource pool comprises Q2 first-type time-domain-resource block(s), and any of the Q2 first-type time-domain-resource block(s) comprised in the first candidate time-domain-resource pool belongs to the first time-domain-resource-block subset, the Q2 being a positive integer not greater than the Q1.

In one embodiment, any of the Q2 first-type time-domain-resource block(s) comprised in the first candidate time-domain-resource pool is one of Q1 first-type time-domain-resource block(s) comprised in the first time-domain-resource-block sub set.

In one embodiment, the first candidate time-domain-resource pool and the first resource pool occupy a same time-domain-resource unit in time domain.

In one embodiment, the first candidate time-domain-resource pool is a time-domain-resource unit occupied by the first resource pool in time domain.

In one embodiment, the first candidate time-domain-resource pool comprises a time-domain-resource unit occupied by the first resource pool in time domain.

In one embodiment, at least one of the Q2 first-type time-domain-resource block(s) comprised in the first candidate time-domain-resource pool does not belong to a time-domain-resource unit occupied by the first resource pool in time domain.

In one embodiment, the first candidate time-domain-resource block is a first-type time-domain-resource block comprised in the first time-domain-resource-block subset, and the first candidate time-domain-resource pool is a time-domain-resource unit occupied by the first resource pool.

In one embodiment, the second candidate time-domain-resource block is a first-type time-domain-resource block comprised in the first time-domain-resource-block subset, and the first candidate time-domain-resource pool comprises a time-domain-resource unit occupied by the first resource pool.

In one embodiment, the first information comprises the first bitmap, which comprises a positive integer number of bits arranged in order.

In one embodiment, the positive integer number of bits arranged in order comprised in the first bitmap respectively correspond to the positive integer number of first-type time-domain-resource blocks among the first time-domain-resource-block subset.

In one embodiment, the first bitmap is used for indicating a positive integer number of first-type time-domain-resource block(s) among the first time-domain-resource-block subset.

In one embodiment, the first bitmap is used for indicating the first candidate time-domain-resource pool out of the first time-domain-resource-block subset.

In one embodiment, the first bitmap is used for indicating the Q2 first-type time-domain-resource block(s) comprised in the first candidate time-domain-resource pool out of the first time-domain-resource-block subset.

In one embodiment, the first bitmap is used for indicating at least one of the Q2 first-type time-domain-resource block(s) comprised in the first candidate time-domain-resource pool out of the first time-domain-resource-block subset.

In one embodiment, the second information comprises a time-domain-resource unit occupied by the first candidate time-domain resource pool.

In one embodiment, the second information comprises a time-frequency resource unit occupied by the first candidate time-domain resource pool.

In one embodiment, the second information comprises a time-domain-resource unit occupied by any of the Q2 first-type time-domain-resource block(s) comprised in the first candidate time-domain resource pool.

In one embodiment, the second information comprises a time-domain-resource unit occupied by at least one of the Q2 first-type time-domain-resource block(s) comprised in the first candidate time-domain resource pool.

Embodiment 2

Figure 2:
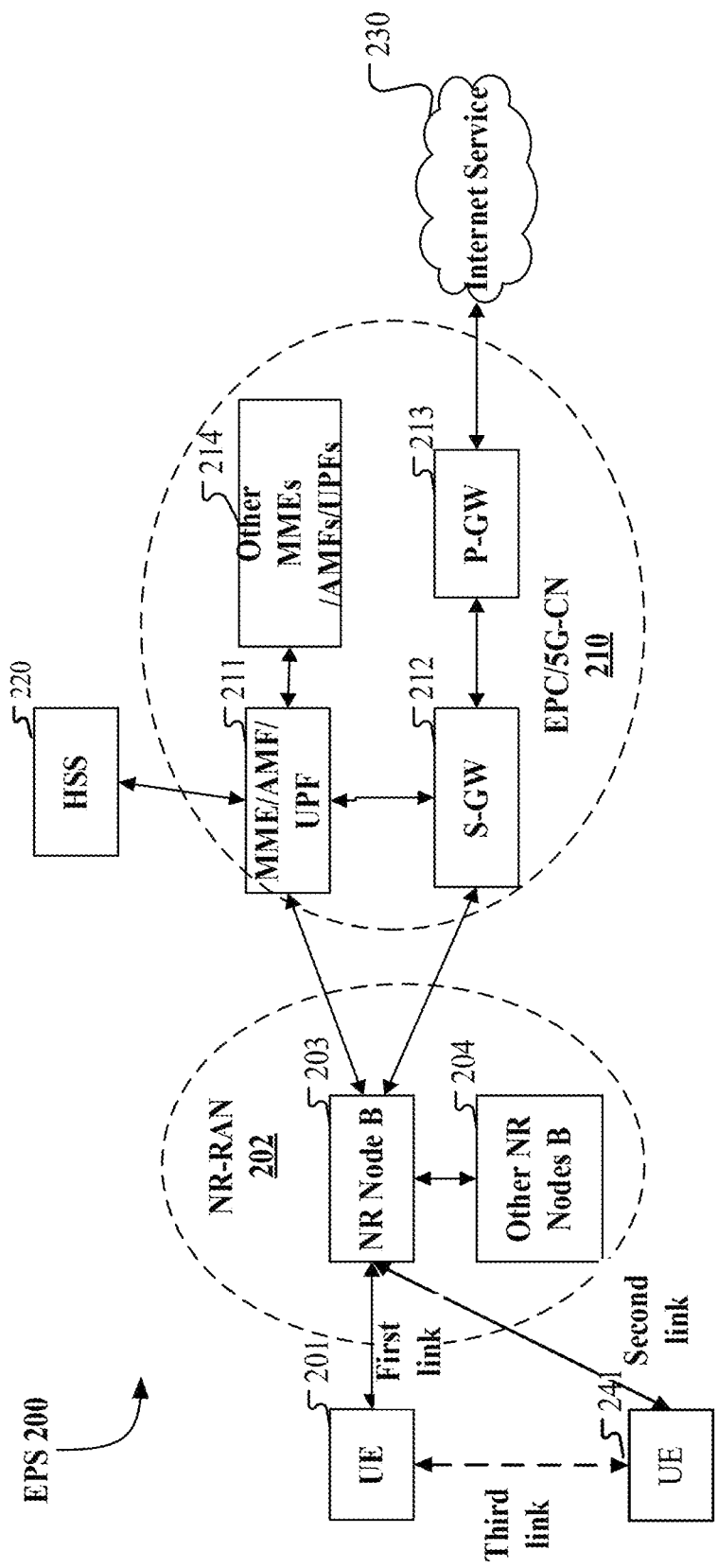
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other applicable terms. The EPS 200 may comprise one or more UEs 201, a NG-RAN 202, an Evolved Packet Core/5G-Core Network (EPC/5G-CN) 210, a Home Subscriber Server (HSS) 220 and an Internet Service 230. The EPS may be interconnected with other access networks. For simple description, the entities/interfaces are not shown. As shown in the figure, the EPS 200 provides packet switching services. Those skilled in the art will find it easy to understand that various concepts presented throughout the present disclosure can be extended to networks providing circuit switching services or other cellular networks. The NG-RAN comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrowband Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the first node in the present disclosure comprises the UE 201.

In one embodiment, the second node in the present disclosure comprises the UE 241.

In one embodiment, the UE in the present disclosure comprises the UE 201.

In one embodiment, the UE in the present disclosure comprises the UE 241.

In one embodiment, the UE 201 supports sidelink transmissions.

In one embodiment, the UE 201 supports a PC5 interface.

In one embodiment, the UE 241 supports sidelink transmissions.

In one embodiment, the UE 241 supports a PC5 interface.

In one embodiment, a transmitter of the first information in the present disclosure comprises the UE 241.

In one embodiment, a receiver of the first information in the present disclosure comprises the UE 201.

In one embodiment, a transmitter of the second information in the present disclosure comprises the UE 201.

In one embodiment, a transmitter of the second information in the present disclosure comprises the gNB 203.

In one embodiment, a receiver of the second information in the present disclosure comprises the UE 201.

In one embodiment, a transmitter of a first signal in the present disclosure comprises the UE 201.

In one embodiment, a receiver of a first signal in the present disclosure comprises the UE 241.

Embodiment 3

Figure 3:
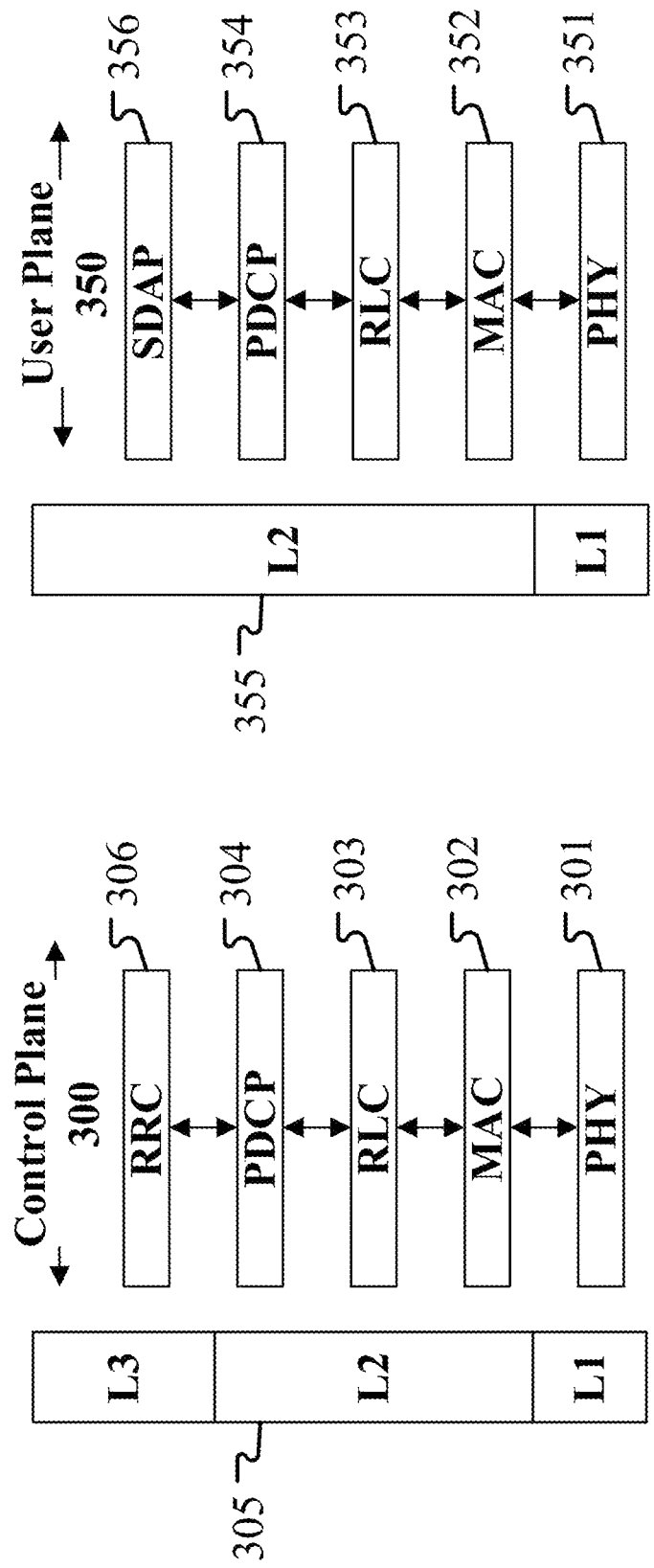
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or RSU in V2X) and a second communication node (gNB, UE or RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between the first communication node and the second communication node, as well as two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for the first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between the second communication node and the first communication node. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the PHY 301.

In one embodiment, the first information in the present disclosure is generated by the RRC sublayer 306.

In one embodiment, the second information in the present disclosure is generated by the RRC sublayer 306.

In one embodiment, the second information in the present disclosure is transmitted to the PHY 301 via the MAC sublayer 302.

In one embodiment, the first signal in the present disclosure is generated by the SDAP sublayer 356.

In one embodiment, the first signal in the present disclosure is transmitted to the PHY 351 via the MAC sublayer 352.

In one embodiment, the first signal in the present disclosure is generated by the RRC sublayer 306.

In one embodiment, the first signal in the present disclosure is transmitted to the PHY 301 via the MAC sublayer 302.

Embodiment 4

Figure 4:
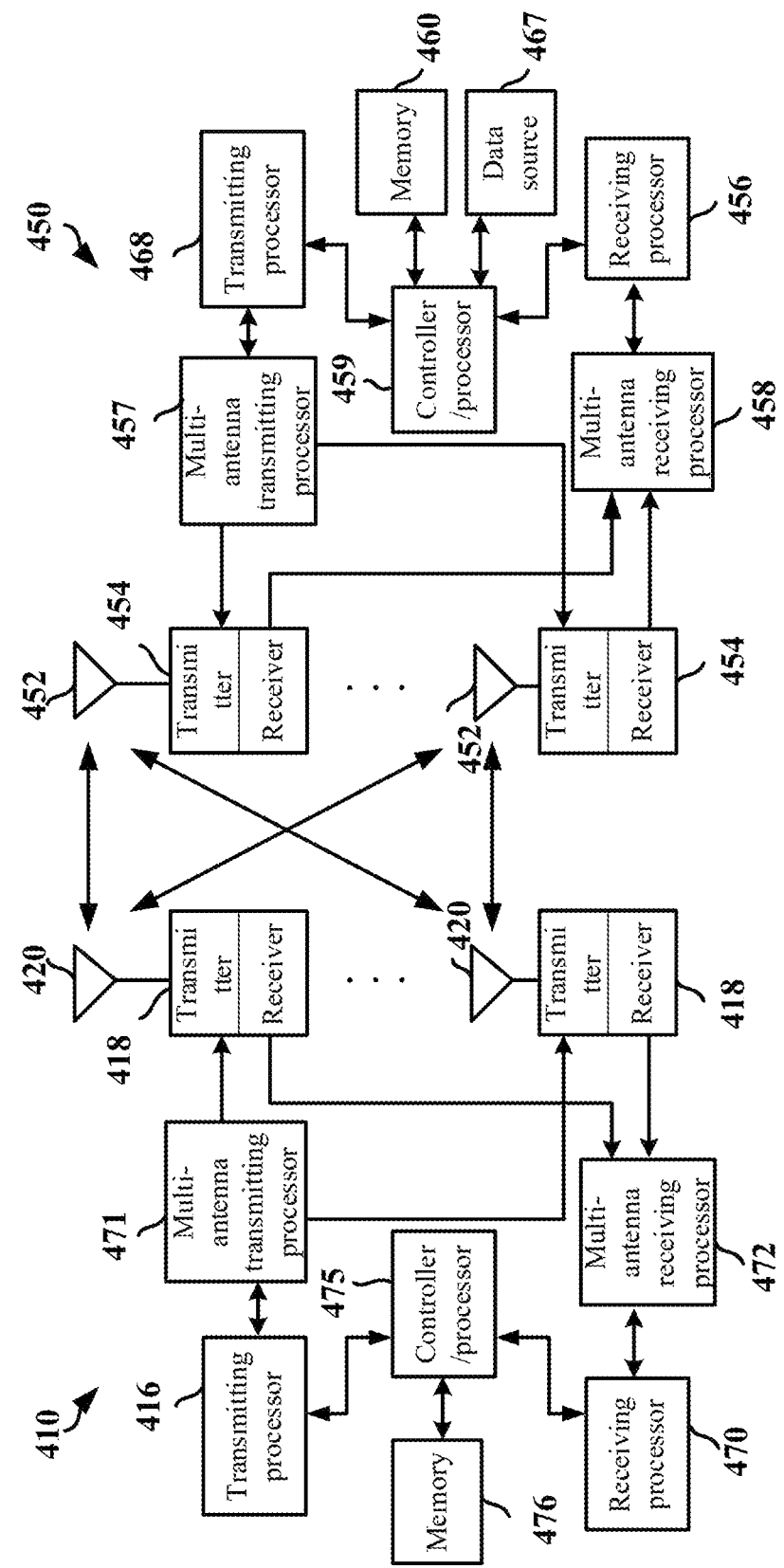
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 410 and a second communication device 450 that are in communication with each other in access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In the transmission from the first communication device 410 to the second communication device 450, at the first communication device 410, a higher-layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream. Each radio frequency stream is later provided to different antennas 420.

In the transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In the transmission from the second communication device to the first communication device, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively perform functions of the L1 layer. The controller/processor 475 performs functions of the L2 layer. The controller/processor 475 can be connected with the memory 476 that stores program code and data. The memory 476 can be called a computer readable medium. In the transmission from the second communication device 450 to the first communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises: at least one processor and at least one memory, and the at least one memory includes computer program codes; the at least one memory and the computer program codes are configured to be used in collaboration with the at least one processor. The second communication device 450 at least: receives first information, the first information being used to indicate a first time-unit format; determines second information; and determines a first resource pool; herein, a first time window comprises Q first-type time-domain-resource blocks, Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first time-unit format is used for indicating whether the first symbol is a first-type symbol; the second information is used for indicating a positive integer number of first-type time-domain-resource block(s) out of a first time-domain-resource-block subset, the first time-domain-resource-block subset comprises a positive integer number of first-type time-domain-resource block(s) among the Q first-type time-domain-resource blocks; the first resource pool comprises a positive integer number of first-type time-domain-resource block(s) among the first time-domain-resource-block subset in time domain, and the first time-unit format and the second information are jointly used for determining the first resource pool.

In one embodiment, the second communication device 450 comprises: a memory in which a computer-readable instruction program is stored, wherein the computer-readable instruction program generates an action when executed by at least one processor, the action includes: receiving first information, the first information being used to indicate a first time-unit format; determining second information; and determining a first resource pool; herein, a first time window comprises Q first-type time-domain-resource blocks, the Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first time-unit format is used for indicating whether the first symbol is a first-type symbol; the second information is used for indicating a positive integer number of first-type time-domain-resource block(s) out of a first time-domain-resource-block subset, the first time-domain-resource-block subset comprises a positive integer number of first-type time-domain-resource block(s) among the Q first-type time-domain-resource blocks; the first resource pool comprises a positive integer number of first-type time-domain-resource block(s) among the first time-domain-resource-block subset in time domain, and the first time-unit format and the second information are jointly used for determining the first resource pool.

In one embodiment, the first communication device 410 comprises: at least one processor and at least one memory, and the at least one memory includes computer program codes; the at least one memory and the computer program codes are configured to be used in collaboration with the at least one processor. The first communication device 410 at least: transmits first information, the first information being used to indicate a first time-unit format; herein, a first time window comprises Q first-type time-domain-resource blocks, the Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first time-unit format is used for indicating whether the first symbol is a first-type symbol; the second information is determined by a receiver of the first information, and the second information is used for indicating a positive integer number of first-type time-domain-resource block(s) out of a first time-domain-resource-block subset; the first time-domain-resource-block subset comprises a positive integer number of first-type time-domain-resource block(s) among the Q first-type time-domain-resource blocks; a first resource pool comprises a positive integer number of first-type time-domain-resource block(s) among the first time-domain-resource-block subset in time domain, and the first time-unit format and the second information are jointly used for determining the first resource pool.

In one embodiment, the first communication device 410 comprises: a memory in which a computer-readable instruction program is stored, wherein the computer-readable instruction program generates an action when executed by at least one processor, the action includes: transmitting first information, the first information being used to indicate a first time-unit format; herein, a first time window comprises Q first-type time-domain-resource blocks, the Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first time-unit format is used for indicating whether the first symbol is a first-type symbol; the second information is determined by a receiver of the first information, and the second information is used for indicating a positive integer number of first-type time-domain-resource block(s) out of a first time-domain-resource-block subset; the first time-domain-resource-block subset comprises a positive integer number of first-type time-domain-resource block(s) among the Q first-type time-domain-resource blocks; a first resource pool comprises a positive integer number of first-type time-domain-resource block(s) among the first time-domain-resource-block subset in time domain, and the first time-unit format and the second information are jointly used for determining the first resource pool.

In one embodiment, at least one of the antenna 452, the receiver 454, the multi-antenna receiving processor 458, the receiving processor 456, the controller/processor 459, the memory 460, or the data source 467 is used for receiving first information in the present disclosure.

In one embodiment, at least one of the antenna 452, the receiver 454, the multi-antenna receiving processor 458, the receiving processor 456, the controller/processor 459, the memory 460, or the data source 467 is used for determining second information in the present disclosure.

In one embodiment, at least one of the antenna 452, the receiver 454, the multi-antenna receiving processor 458, the receiving processor 456, the controller/processor 459, the memory 460, or the data source 467 is used for determining a first time-domain resource subset in the present disclosure.

In one embodiment, at least one of the antenna 452, the receiver 454, the multi-antenna receiving processor 458, the receiving processor 456, the controller/processor 459, the memory 460, or the data source 467 is used for determining a first resource pool in the present disclosure.

In one embodiment, at least one of the antenna 452, the transmitter 454, the multi-antenna transmitting processor 458, the transmitting processor 468, the controller/processor 459, the memory 460, or the data sources 467 is used for determining a first time-frequency-resource block in a first resource pool in the present disclosure;

In one embodiment, at least one of the antenna 452, the transmitter 454, the multi-antenna transmission processor 458, the transmitting processor 468, the controller/processor 459, the memory 460, or the data source 467 is used for transmitting a first signal in the first time-frequency-resource block in the present disclosure.

In one embodiment, at least one of the antenna 420, the transmitter 418, the multi-antenna transmitting processor 471, the transmitting processor 416, the controller/processor 475, or the memory 476 is used for transmitting first information in the present disclosure.

In one embodiment, at least one of the antenna 420, the receiver 418, the multi-antenna receiving processor 472, the receiving processor 470, the controller/processor 475, or the memory 476 is used for receiving a first signal in a first time-frequency-resource block in the present disclosure.

Embodiment 5

Figure 5:
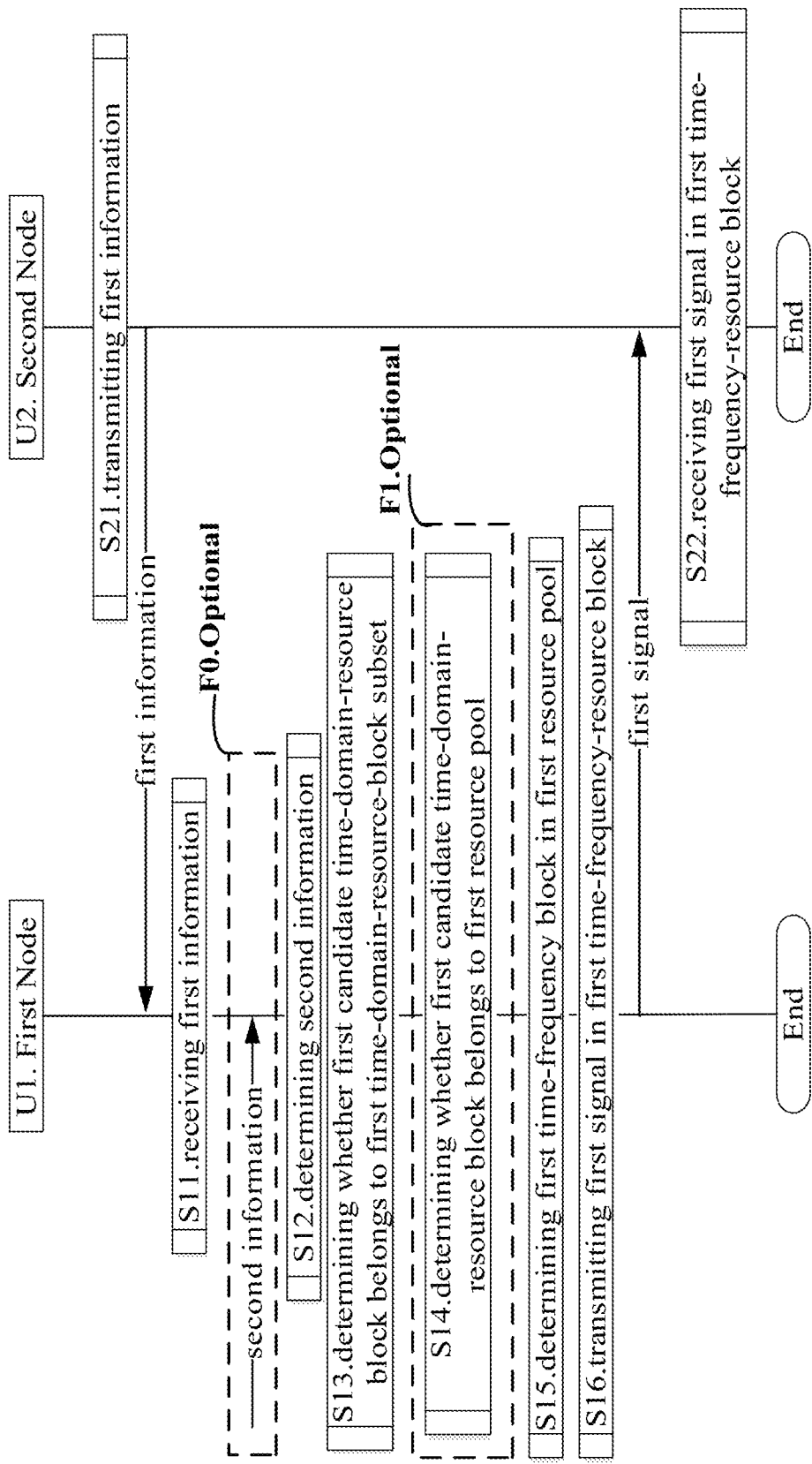
FIG. 5 illustrates a flowchart of a transmission of a radio signal according to one embodiment of the present disclosure.

Embodiment 5 illustrates a flowchart of transmission of a radio signal according to one embodiment in the present disclosure, as shown in FIG. 5. In FIG. 5, a first node U1 and a second node U2 communicate through an air interface. In FIG. 5, steps in dotted box F0 and in dotted box F1 are respectively optional.

The first node U1 receives first information in step S11; determines second information in step S12; determines whether a first candidate time-domain-resource block belongs to a first time-domain-resource-block subset in step S13; determines whether a first candidate time-domain-resource block belongs to a first resource pool in step S14; determines a first time-frequency-resource block in a first resource pool in step S15; transmits a first signal in a first time-frequency-resource block in step S16.

The second node U2 transmits first information in step S21; receives a first signal in a first time-frequency-resource block in step S22.

In Embodiment 5, a first time window comprises Q first-type time-domain-resource blocks, the Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first information is used for indicating a first time-unit format, and the first time-unit format is used for indicating whether the first symbol is a first-type symbol; the second information is used for indicating a positive integer number of first-type time-domain-resource block(s) out of a first time-domain-resource-block subset, the first time-domain-resource-block subset comprises a positive integer number of first-type time-domain-resource block(s) among the Q first-type time-domain-resource blocks; the first resource pool comprises a positive integer number of first-type time-domain-resource block(s) among the first time-domain-resource-block subset in time domain, and the first time-unit format and the second information are jointly used for determining the first resource pool; the first candidate time-domain-resource block is one of the Q first-type time-domain-resource blocks; the first time-unit format is used for determining whether the first candidate time-domain-resource block belongs to the first time-domain-resource-block subset; when the first candidate time-domain-resource block belongs to the first time-domain-resource-block subset, the second information comprises a first bit, which corresponds to the first candidate time-domain-resource block and is used for determining whether the first candidate time-domain-resource block belongs to the first resource pool; the first resource pool comprises the first time-frequency-resource block.

In one embodiment, a time-unit-format list comprises a positive integer number of first-type time-unit format(s), the first time-unit format is a first-type time-unit format among the time-unit-format list, and a time-unit-format subset comprises a positive integer number of first-type time-unit format(s) among the time-unit-format list; when the first time-unit format belongs to the time-unit-format subset, the first candidate time-domain-resource block does not belong to the first time-domain-resource-block subset.

In one embodiment, the first time-unit format is used for indicating X1 multicarrier symbol(s) comprised in the first candidate time-domain-resource block, the X1 multicarrier symbol(s) all being the first-type symbol(s), the X1 being a non-negative integer; when the X1 is less than a first threshold, the first candidate time-domain-resource block does not belong to the first time-domain-resource-block subset.

In one embodiment, a step in box F0 in FIG. 5 exists.

In one embodiment, a step in box F0 in FIG. 5 does not exist.

In one embodiment, a step in box F1 in FIG. 5 exists.

In one embodiment, a step in box F1 in FIG. 5 does not exist.

In one embodiment, when a transmitter of the second information is a higher layer of the first node, a step in box F0 in FIG. 5 does not exist.

In one embodiment, when the second information is pre-defined, a step in box F0 in FIG. 5 does not exist.

In one embodiment, when the second information is pre-configured, a step in box F0 in FIG. 5 does not exist.

In one embodiment, when the second information is referred based on a predefined definition, a step in box F0 in FIG. 5 does not exist.

In one embodiment, when a transmitter of the second information is not a higher layer of the first node, a step in box F0 in FIG. 5 exists.

In one embodiment, when a transmitter of the second information is another communication node, the another communication node is not the first node, and a step in box F0 in FIG. 5 exists.

In one subembodiment of the above embodiment, the another communication node is a base station.

In one subembodiment of the above embodiment, the another communication node is a relay.

In one subembodiment of the above embodiment, the another communication node is a UE.

In one embodiment, when a transmitter of the second information is a communication node different from the first node, the one communication node does not comprise the first node, and a step in box F0 in FIG. 5 exists.

In one embodiment, when a transmitter of the second information is a base station, a step in box F0 in FIG. 5 exists.

In one embodiment, when a transmitter of the second information is a relay, a step in box F0 in FIG. 5 exists.

In one embodiment, when a transmitter of the second information is a UE different from the first node, a step in box F0 in FIG. 5 exists.

In one embodiment, a result in the step S13 is used for determining whether a step in box F1 in FIG. 5 exists.

In one embodiment, when the first candidate time-domain-resource block belongs to the first time-domain-resource-block subset, a step in box F1 in FIG. 5 exists.

In one embodiment, when the first candidate time-domain-resource block does not belong to the first time-domain-resource-block subset, a step in box F1 in FIG. 5 does not exist.

In one embodiment, when the result of the determining whether a first candidate time-domain-resource block belongs to a first time-domain-resource-block subset is "YES", a step in box F1 in FIG. 5 exists.

In one embodiment, when the result of the determining whether a first candidate time-domain-resource block belongs to a first time-domain-resource-block subset is "NO", a step in box F1 in FIG. 5 does not exist.

In one embodiment, the first candidate time-domain-resource block is one of the Q first-type time-domain-resource block, and the first candidate time-domain-resource block belongs to the first time-domain-resource-block subset.

In one embodiment, the first candidate time-domain-resource block is one of the Q first-type time-domain-resource block, and the first candidate time-domain-resource block does not belong to the first time-domain-resource-block sub set.

In one embodiment, the first candidate time-domain-resource block is one of the Q first-type time-domain-resource block, and the first time-domain-resource-block subset comprises the first candidate time-domain-resource block.

In one embodiment, the first candidate time-domain-resource block is one of the Q first-type time-domain-resource block, and the first time-domain-resource-block subset does not comprise the first candidate time-domain-resource block.

In one embodiment, the first time-domain-resource-block subset comprises Q1 first-type time-domain-resource block(s), and any of the Q1 first-type time-domain-resource block(s) comprised in the first time-domain-resource block is one of Q first-type time-domain-resource blocks, the Q1 being a positive integer not greater than the Q.

In one embodiment, the first candidate time-domain-resource block is one of the Q first-type time-domain-resource blocks, and the first candidate time-domain-resource block is one of the Q1 first-type time-domain-resource block(s) comprised in the first time-domain-resource-block subset.

In one embodiment, the first candidate time-domain-resource block is one of the Q first-type time-domain-resource blocks, and the first candidate time-domain-resource block is not any of the Q1 first-type time-domain-resource block(s) comprised in the first time-domain-resource-block subset.

In one embodiment, the first time-domain-resource-block subset comprises the first candidate time-domain-resource block, and the first resource pool comprises the first candidate time-domain-resource block.

In one embodiment, the first time-domain-resource-block subset comprises the first candidate time-domain-resource block, and the first resource pool does not comprise the first candidate time-domain-resource block.

In one embodiment, the first resource pool comprises Q3 first-type time-domain-resource block(s) in time domain, any of the Q3 first-type time-domain-resource block(s) comprised in the first resource pool in time domain is one of the Q1 first-type time-domain-resource block(s) comprised in the first time-domain-resource-block subset, the Q3 being a positive integer not greater than the Q1.

In one embodiment, the first candidate time-domain-resource block is one of the Q1 first-type time-domain-resource block(s) comprised in the first time-domain-resource-block subset, and the first candidate time-domain-resource block is one of the Q3 first-type time-domain-resource block(s) comprised in the first resource pool in time domain.

In one embodiment, the first candidate time-domain-resource block is one of the Q1 first-type time-domain-resource block(s) comprised in the first time-domain-resource-block subset, and the first candidate time-domain-resource block is not any of the Q3 first-type time-domain-resource block(s) comprised in the first resource pool in time domain.

In one embodiment, the first time-unit format is used for indicating a transmission format of the first candidate time-domain-resource block.

In one embodiment, the first candidate time-domain-resource block comprises a positive integer number of time-domain-resource unit(s), and the first time-unit format is used for indicating a transmission format of any of the positive integer number of time-domain-resource unit(s) comprised in the first candidate time-domain-resource block.

In one embodiment, the first candidate time-domain-resource block comprises a positive integer number of time-domain-resource unit(s), and a first time unit is one of the positive integer number of time domain resource unit(s) comprised in the first candidate time-domain-resource block.

In one embodiment, the first candidate time-domain-resource block is the same as the first time unit.

In one embodiment, the first candidate time-domain-resource block is the first time unit.

In one embodiment, the first time-frequency-resource block is different from the first candidate time-domain-resource block in time domain.

In one embodiment, the first time-frequency-resource block is the same as the first candidate time-domain-resource block in time domain.

In one embodiment, the first time-frequency-resource block is orthogonal to the first candidate time-domain-resource block in time domain.

In one embodiment, the first time-frequency-resource block overlaps with the first candidate time-domain-resource block in time domain.

In one embodiment, the first resource pool comprises the first time-frequency-resource block.

In one embodiment, the first time-frequency-resource block belongs to the first resource pool.

In one embodiment, the first resource pool comprises a positive integer number of first-type time-frequency-resource block(s), and the first time-frequency-resource block is one of the positive integer number of first-type time-frequency-resource block(s).

In one embodiment, the first resource pool comprises a positive integer number of first-type time-domain-resource block(s) among the first time-domain-resource-block subset in time domain, and the positive integer number of first-type time-domain-resource block(s) comprised in the first resource pool in time domain respectively correspond(s) to the positive integer number of first-type time-frequency-resource block(s) comprised in the first resource pool.

In one embodiment, a time-domain-resource unit occupied by any of the positive integer number of first-type time-frequency-resource block(s) comprised in the first resource pool in time domain is one of the positive integer number of first-type time-domain-resource block(s) comprised in the first resource pool in time domain.

In one embodiment, a time-domain-resource unit occupied by any of the positive integer number of first-type time-frequency-resource block(s) comprised in the first resource pool in time domain is the same as a time-domain-resource unit occupied by one of the positive integer number of first-type time-domain-resource block(s) comprised in the first resource pool in time domain.

In one embodiment, the first time-frequency-resource block comprises a positive integer number of time-domain-resource unit(s) in time domain.

In one embodiment, a positive integer number of time-domain-resource units comprised in the first time-frequency-resource block are consecutive in time.

In one embodiment, at least two of a positive integer number of time-domain-resource units comprised in the first time-frequency-resource block are non-consecutive in time.

In one embodiment, the first time-frequency-resource block comprises a positive integer number of frequency-domain resource unit(s) in frequency domain.

In one embodiment, a positive integer number of frequency-domain resource units comprised in the first time-frequency-resource block are consecutive in frequency domain.

In one embodiment, at least two of a positive integer number of frequency-domain resource units comprised in the first time-frequency-resource block are non-consecutive in frequency domain.

In one embodiment, the first time-frequency-resource block comprises a positive integer number of time-frequency-resource unit(s).

In one embodiment, a positive integer number of time-frequency-resource units comprised in the first time-frequency-resource block are consecutive in time domain.

In one embodiment, a positive integer number of time-frequency-resource units comprised in the first time-frequency-resource block are consecutive in frequency domain.

In one embodiment, at least two of a positive integer number of time-frequency-resource units comprised in the first time-frequency-resource block are non-consecutive in time domain.

In one embodiment, at least two of a positive integer number of time-frequency-resource units comprised in the first time-frequency-resource block are non-consecutive in frequency domain.

In one embodiment, the first time-frequency-resource block comprises a PSCCH.

In one embodiment, the first time-frequency-resource block comprises a PSSCH.

In one embodiment, the first time-frequency-resource block comprises a PSFCH.

In one embodiment, the first time-frequency-resource block comprises a PSCCH and a PSSCH.

In one embodiment, the first time-frequency-resource block comprises a PSCCH and a PSFCH.

In one embodiment, the first time-frequency-resource block comprises a PSCCH, a PSSCH and a PSFCH.

In one embodiment, the determining a first time-frequency-resource block comprises that the first time-frequency-resource block is indicated.

In one embodiment, the determining a first time-frequency-resource block comprises that the first time-frequency-resource block is selected independently by the first node.

In one embodiment, the first time-frequency-resource block is dynamically-configured.

In one embodiment, the first time-frequency-resource block is indicated by a physical-layer signaling.

In one embodiment, the first time-frequency-resource block is indicated by DCI.

In one embodiment, the first time-frequency-resource block is indicated by SCI.

In one embodiment, the first time-frequency-resource block is semi-statically configured.

In one embodiment, the first time-frequency-resource block is configured by a higher-layer signaling.

In one embodiment, the first time-frequency-resource block is configured by an RRC signaling.

In one embodiment, the first time-frequency-resource block is configured by an RRC IE.

In one embodiment, the first time-frequency-resource block is selected independently by the first node.

In one embodiment, the first time-frequency-resource block is obtained by the first node through Sensing.

In one embodiment, the first time-frequency-resource block is obtained by the first node through a Resource Selection.

In one embodiment, the first time-frequency-resource block is obtained by the first node through a Resource Re-selection.

In one embodiment, the first time-frequency-resource block is obtained by the first node according to a received signal quality.

In one embodiment, the signal quality comprises a Reference Signal Receiving Power (RSRP).

In one embodiment, the signal quality comprises a Reference Signal Receiving Quality (RSRQ).

In one embodiment, the signal quality comprises a Received Signal Strength Indication (RSSI).

In one embodiment, the signal quality is an average power of all signals received in a positive integer number of time-frequency-resource unit(s).

In one embodiment, all signals received in the positive integer number of time-frequency-resource unit(s) comprise a Reference Signal (RS), a data signal, an interference signal and a noise signal.

In one embodiment, the signal quality comprises a Signal to Noise Ratio (SNR).

In one embodiment, the signal quality comprises a Signal to Interference plus Noise Ratio (SINR).

In one embodiment, the first signal is a baseband signal.

In one embodiment, the first signal is a radio signal.

In one embodiment, the first signal is transmitted through a PSCCH.

In one embodiment, the first signal is transmitted through a PSSCH.

In one embodiment, the first signal is transmitted through a PSCCH and a PSSCH.

In one embodiment, the first signal is Broadcast.

In one embodiment, the first signal is Groupcast.

In one embodiment, the first signal is Unicast.

In one embodiment, the first signal is Cell-specific.

In one embodiment, the first signal is UE-specific.

In one embodiment, the first signal comprises a RS.

In one embodiment, the first signal comprises a Demodulation Reference Signal (DMRS).

In one embodiment, the first signal comprises a Channel State Information-Reference Signal (CSI-RS).

In one embodiment, the first signal comprises a Sidelink DMRS (SL DMRS).

In one embodiment, the first signal comprises a PSSCH DMRS (that is, a DMRS demodulating a PSSCH).

In one embodiment, the first signal comprises a PSCCH DMRS (that is, a DMRS demodulating a PSCCH).

In one embodiment, the first signal comprises a Sidelink CSI-RS (SL CSI-RS).

In one embodiment, the first signal is generated by a pseudo-random sequence.

In one embodiment, the first signal is generated by a Gold sequence.

In one embodiment, the first signal is generated by a M-sequence.

In one embodiment, the first signal is generated by a Zadeoff-Chu sequence.

In one embodiment, a generation method of the first signal refers to 3GPP TS38. 211, chapter 7.4.1.5.

In one embodiment, the first signal comprises a first bit block, and the first bit block comprises a positive integer number of bits arranged in order.

In one embodiment, the first bit block comprises a positive integer number of Code Block(s)(CB).

In one embodiment, the first bit block comprises a positive integer number of Code Block Group(s)(CBG).

In one embodiment, the first bit block comprises a Transport Block (TB).

In one embodiment, the first bit block is obtained by a TB subjected to transport block-level Cyclic Redundancy Check (CRC) attachment.

In one embodiment, the first bit block is a CB in a code block obtained by a TB sequentially subjected to transport block-level CRC attachment, Code Block Segmentation, and code block-level CRC attachment.

In one embodiment, the first signal is obtained after all or part of bits of the first bit block is sequentially subjected to transport block-level CRC attachment, code block segmentation, code block-level CRC attachment, channel coding, rate matching, code block concatenation, scrambling, modulation, layer mapping, antenna port mapping, mapping to physical resource blocks, baseband signal generation, modulation and upconversion.

In one embodiment, the first signal is an output after the first bit block is sequentially subjected to a modulation mapper, a layer mapper, precoding, a resource element mapper, and multicarrier symbol generation.

In one embodiment, the channel coding is based on a polar code.

In one embodiment, the channel coding is based on a Low-density Parity-Check (LDPC) code.

In one embodiment, only the first bit block is used for generating the first signal.

In one embodiment, there exists a bit block other than the first bit block being used for generating the first signal.

In one embodiment, the first bit block comprises data transmitted on a Sidelink Shared Channel (SL-SCH).

In one embodiment, the first signal comprises all or part of a higher-layer signaling.

In one embodiment, the first signal comprises all or part of an RRC signaling.

In one embodiment, the first signal comprises one or more fields of an RRC IE.

In one embodiment, the first signal comprises all or part of a MAC layer signaling.

In one embodiment, the first signal comprises one or more fields of a MAC CE.

In one embodiment, the first signal comprises one or more fields of a PHY layer signaling.

In one embodiment, the first signal comprises one or more fields of a piece of SCI.

Embodiment 6

Figure 6:
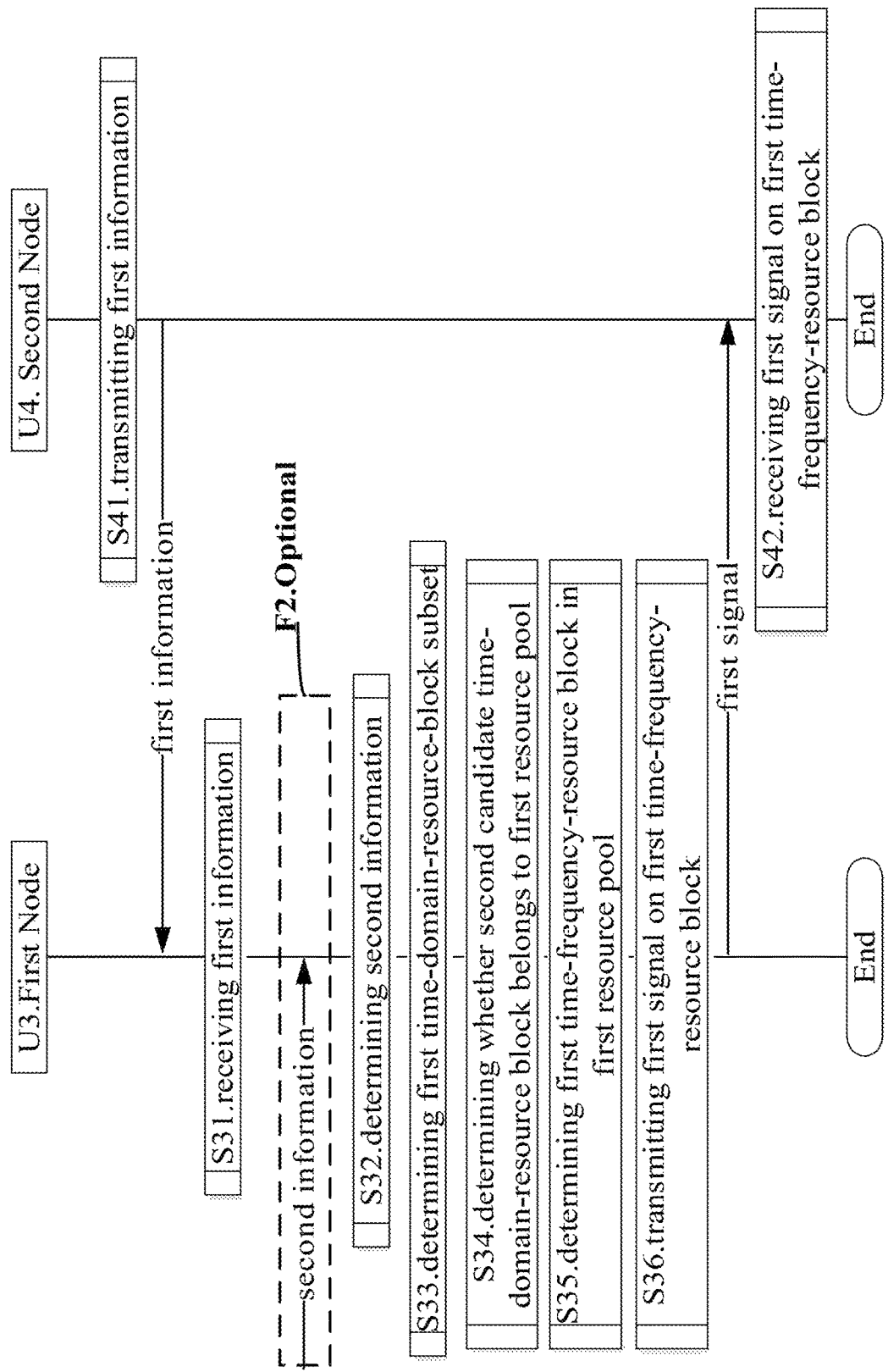
FIG. 6 illustrates a flowchart of a transmission of a radio signal according to one embodiment of the present disclosure.

Embodiment 6 illustrates a flowchart of transmission of a radio signal according to one embodiment of the present disclosure, as shown in FIG. 6. In FIG. 6, a first node U3 and a second node U4 communicate through an air interface. In FIG. 6, a step in dotted box F2 is optional.

The first node U3 transmits first information in step S31; determines second information in step S32; determines a first time-domain-resource-block subset in step S33; determines whether a second candidate time-domain-resource block belongs to a first resource pool in step S34; determines a first time-frequency-resource block in a first resource pool in step S35; transmits a first signal in a first time-frequency-resource block in step S36.

The second node U4 transmits first information in step S41; receives a first signal in a first time-frequency-resource block in step S42.

In Embodiment 6, a first time window comprises Q first-type time-domain-resource blocks, the Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first information is used for indicating a first time-unit format, and the first time-unit format is used for indicating whether the first symbol is a first-type symbol; the second information is used for indicating a positive integer number of first-type time-domain-resource block(s) out of a first time-domain-resource-block subset, the first time-domain-resource-block subset comprises a positive integer number of first-type time-domain-resource block(s) among the Q first-type time-domain-resource blocks; the first resource pool comprises a positive integer number of first-type time-domain-resource block(s) among the first time-domain-resource-block subset in time domain, and the first time-unit format and the second information are jointly used for determining the first resource pool; the second candidate time-domain-resource block is a first-type time-domain-resource block in the first time-domain-resource-block subset; the second information comprises a second bit, which corresponds to the second candidate time-domain-resource block;

In one embodiment, the first time-unit format is used for indicating X2 multicarrier symbol(s) comprised in the second candidate time-domain-resource block, the X2 multicarrier symbol(s) all being the first-type symbol(s), X2 being a non-negative integer; when a value of the second bit is a first value and the X2 is not less than the first threshold, the second candidate time-domain-resource block belongs to the first resource pool.

In one embodiment, a time-unit-format list comprises a positive integer number of first-type time-unit format(s), the first time-unit format is a first-type time-unit format among the time-unit-format list, and a time-unit-format subset comprises a positive integer number of first-type time-unit format(s) among the time-unit-format list; when a value of the second bit is a first value and the first time-unit format does not belong to the time-unit-format subset, the second candidate time-domain-resource block belongs to the first resource pool.

In one embodiment, a step in box F2 in FIG. 6 exists.

In one embodiment, a step in box F2 in FIG. 6 does not exist.

In one embodiment, when a transmitter of the second information is a higher layer of the first node, a step in box F2 in FIG. 6 does not exist.

In one embodiment, when the second information is pre-defined, a step in box F2 in FIG. 6 does not exist.

In one embodiment, when the second information is pre-configured, a step in box F2 in FIG. 6 does not exist.

In one embodiment, when the second information is referred based on a predefined definition, a step in box F2 in FIG. 6 does not exist.

In one embodiment, when a transmitter of the second information is not a higher layer of the first node, a step in box F2 in FIG. 6 exists.

In one embodiment, when a transmitter of the second information is another communication node, the another communication node is not the first node, and a step in box F2 in FIG. 6 exists.

In one subembodiment of the above embodiment, the another communication node is a base station.

In one subembodiment of the above embodiment, the another communication node is a relay.

In one subembodiment of the above embodiment, the another communication node is a UE.

In one embodiment, when a transmitter of the second information is a communication node different from the first node, the one communication node does not comprise the first node, and a step in box F2 in FIG. 6 exists.

In one embodiment, when a transmitter of the second information is a base station, a step in box F2 in FIG. 6 exists.

In one embodiment, when a transmitter of the second information is a relay, a step in box F2 in FIG. 6 exists.

In one embodiment, when a transmitter of the second information is a UE different from the first node, a step in box F2 in FIG. 6 exists.

In one embodiment, the first time-domain-resource-block subset comprises a positive integer number of first-type time-domain-resource block(s), and the second candidate time-domain-resource block is one of the positive integer number of first-type time-domain-resource block(s) comprised in the first time-domain-resource-block subset.

In one embodiment, the first time-domain-resource-block subset comprises the second candidate time-domain-resource block, and the first resource pool comprises the second candidate time-domain-resource block in time domain.

In one embodiment, the first time-domain-resource-block subset comprises the second candidate time-domain-resource block, and the first resource pool does not comprise the second candidate time-domain-resource block in time domain.

In one embodiment, the second candidate time-domain-resource block is one of the Q1 first-type time-domain-resource block(s) comprised in the first time-domain-resource-block subset, and the second candidate time-domain-resource block is one of the Q3 first-type time-domain-resource block(s) comprised in the first resource pool in time domain.

In one embodiment, the second candidate time-domain-resource block is one of the Q1 first-type time-domain-resource block(s) comprised in the first time-domain-resource-block subset, and the second candidate time-domain-resource block is not any of the Q3 first-type time-domain-resource block(s) comprised in the first resource pool in time domain.

In one embodiment, the first time-unit format is used for indicating a transmission format of the second candidate time-domain-resource block.

In one embodiment, the second candidate time-domain-resource block comprises a positive integer number of time-domain-resource unit(s), and the first time-unit format is used for indicating a transmission format of any of the positive integer number of time-domain-resource unit(s) comprised in the second candidate time-domain-resource block.

In one embodiment, the second candidate time-domain-resource block comprises a positive integer number of time-domain-resource unit(s), and a first time unit is one of the positive integer number of time domain resource unit(s) comprised in the second candidate time-domain-resource block.

In one embodiment, the second candidate time-domain-resource block is the same as a first time unit.

In one embodiment, the second candidate time-domain-resource block is a first time unit.

In one embodiment, the first time-frequency-resource block is different from the second candidate time-domain-resource block in time domain.

In one embodiment, the first time-frequency-resource block is the same as the second candidate time-domain-resource block in time domain.

In one embodiment, the first time-frequency-resource block is orthogonal to the second candidate time-domain-resource block in time domain.

In one embodiment, the first time-frequency-resource block overlaps with the second candidate time-domain-resource block in time domain.

Embodiment 7

Figure 7:
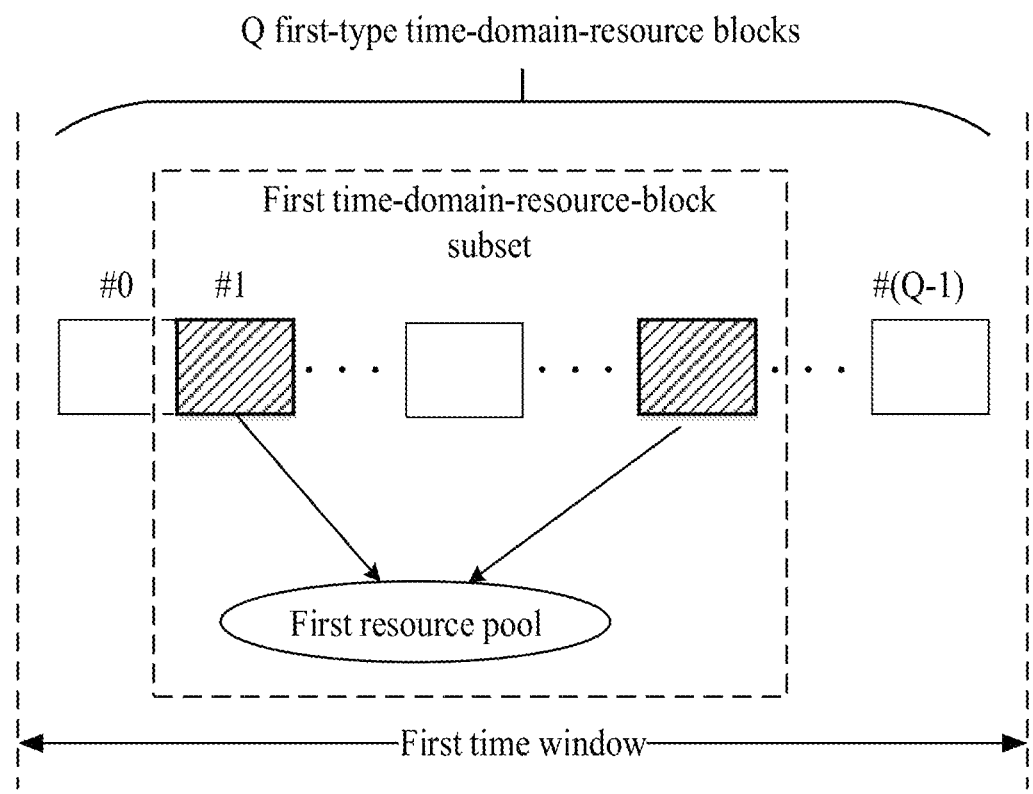
FIG. 7 illustrates a schematic diagram of relations among a first time window, Q first-type time-domain-resource blocks, a first time-domain-resource-block subset and a first resource pool according to one embodiment of the present disclosure.

Embodiment 7 illustrates a schematic diagram of relations among a first time window, Q first-type time-domain-resource blocks, a first time-domain-resource-block subset and a first resource pool according to one embodiment of the present disclosure, as shown in FIG. 7. In FIG. 7, each solid small box represents one of the Q first-type time-domain-resource blocks in the present disclosure; a dotted box represents the first time-domain-resource-block subset in the present disclosure; a heavy-line box filled with slashes represents a first-type time-domain-resource block among the first resource pool in the present disclosure.

In Embodiment 7, a first time window comprises Q first-type time-domain-resource blocks, Q being a positive integer greater than 1; the first time-domain-resource-block subset comprises Q1 first-type time-domain-resource block(s), and any of the Q1 first-type time-domain-resource block(s) comprised in the first time-domain-resource block is one of Q first-type time-domain-resource blocks, Q1 being a positive integer not greater than the Q; the first resource pool comprises Q3 first-type time-domain-resource block(s) in time domain, any of the Q3 first-type time-domain-resource block(s) comprised in the first resource pool in time domain is one of the Q3 first-type time-domain-resource block(s) comprised in the first time-domain-resource-block subset, Q3 being a positive integer not greater than the Q1.

In one embodiment, the Q1 is greater than 1, and the Q3 is equal to 1.

In one embodiment, the Q1 is equal to 1, and the Q3 is equal to 1.

In one embodiment, the Q1 is greater than the Q3, and the Q3 is greater than 1.

In one embodiment, the Q1 is equal to the Q3, and the Q3 is greater than 1.

In one embodiment, the first time window comprises Q first-type time-domain-resource blocks, and any of the Q first-type time-domain-resource blocks comprises a positive integer number of time-domain-resource unit(s).

In one embodiment, the first time window comprises a positive integer number of radio frame(s).

In one embodiment, the first time window comprises a positive integer number of slot(s).

In one embodiment, the first time window comprises 10 radio frames.

In one embodiment, the first time window comprises 20 slots.

In one embodiment, the first time window comprises 40 slots.

In one embodiment, a number of slots comprised in the first time window is related to a subcarrier spacing of subcarriers in a frequency-domain resource unit corresponding to any of the Q first-type time-domain-resource blocks.

In one embodiment, the Q first-type time-domain-resource blocks comprise the first time-domain-resource-block subset, and any first-type time-domain-resource block among the first time-domain-resource-block subset comprises a positive integer number of time-domain-resource unit(s).

In one embodiment, one of the Q first-type time-domain-resource blocks is a subframe.

In one embodiment, one of the Q first-type time-domain-resource blocks is a slot.

In one embodiment, the Q first-type time-domain-resource blocks are respectively Q subframes.

In one embodiment, the Q first-type time-domain-resource blocks are respectively Q slots.

In one embodiment, the first time-domain-resource-block subset comprises a time-domain-resource unit occupied by the first resource pool in time domain, and any of the Q3 first-type time-domain-resource block(s) comprised in the first resource pool in time domain comprises a positive integer number of time-domain-resource unit(s).

In one embodiment, one of the Q1 first-type time-domain-resource block(s) comprised in the first time-domain-resource-block subset is a subframe.

In one embodiment, one of the Q1 first-type time-domain-resource block(s) comprised in the first time-domain-resource-block subset is a slot.

In one embodiment, the Q1 first-type time domain resource block(s) comprised in the first time-domain-resource-block subset is(are) respectively Q1 subframe(s).

In one embodiment, the Q1 first-type time domain resource block(s) comprised in the first time-domain-resource-block subset is(are) respectively Q1 slot(s).

In one embodiment, the Q1 first-type time domain resource blocks comprised in the first time-domain-resource-block subset are non-consecutive in time domain.

In one embodiment, at least two adjacent first-type time-domain-resource blocks among the Q1 first-type time-domain-resource blocks comprised in the first time-domain-resource-block subset are non-consecutive in time domain.

In one embodiment, the Q1 first-type time domain resource blocks comprised in the first time-domain-resource-block subset are consecutive in time domain.

In one embodiment, the first time domain resource block subset does not comprise a downlink slot.

In one embodiment, the first time domain resource block subset does not comprise a downlink subframe.

In one embodiment, the first time-domain-resource-block subset does not comprise a slot used for transmitting a synchronization signal.

In one embodiment, the first time-domain-resource-block subset does not comprise a slot used for transmitting a broadcast signal.

In one embodiment, the first time-domain-resource-block subset does not comprise a slot used for transmitting a Sidelink Synchronization Signal/Physical Sidelink Broadcast Channel block (SLSS/PSBCH).

In one embodiment, the first time-domain-resource-block subset does not comprise a slot used for transmitting a Physical Random Access Channel (PRACH).

In one embodiment, the first time-domain-resource-block subset does not comprise a slot used for transmitting a Physical Downlink Control Channel (PDCCH).

In one embodiment, the first resource pool is used for sidelink transmissions.

In one embodiment, the first resource pool is used for V2X.

In one embodiment, the first resource pool is configured.

In one embodiment, the first resource pool is configured by a higher-layer signaling.

In one embodiment, the first resource pool is pre-configured.

In one embodiment, the first resource pool is configured by a base station.

In one embodiment, the first resource pool is determined based on the second information.

In one embodiment, the first resource pool is determined based on the first bitmap.

In one embodiment, the first resource pool is determined by the first node based on the second information.

In one embodiment, the first time unit is used for determining the first resource pool.

In one embodiment, the first time unit and the second information are jointly used for determining the first resource pool.

In one embodiment, the first time unit and the first bitmap are jointly used for determining the first resource pool.

Embodiment 8

Figure 8:
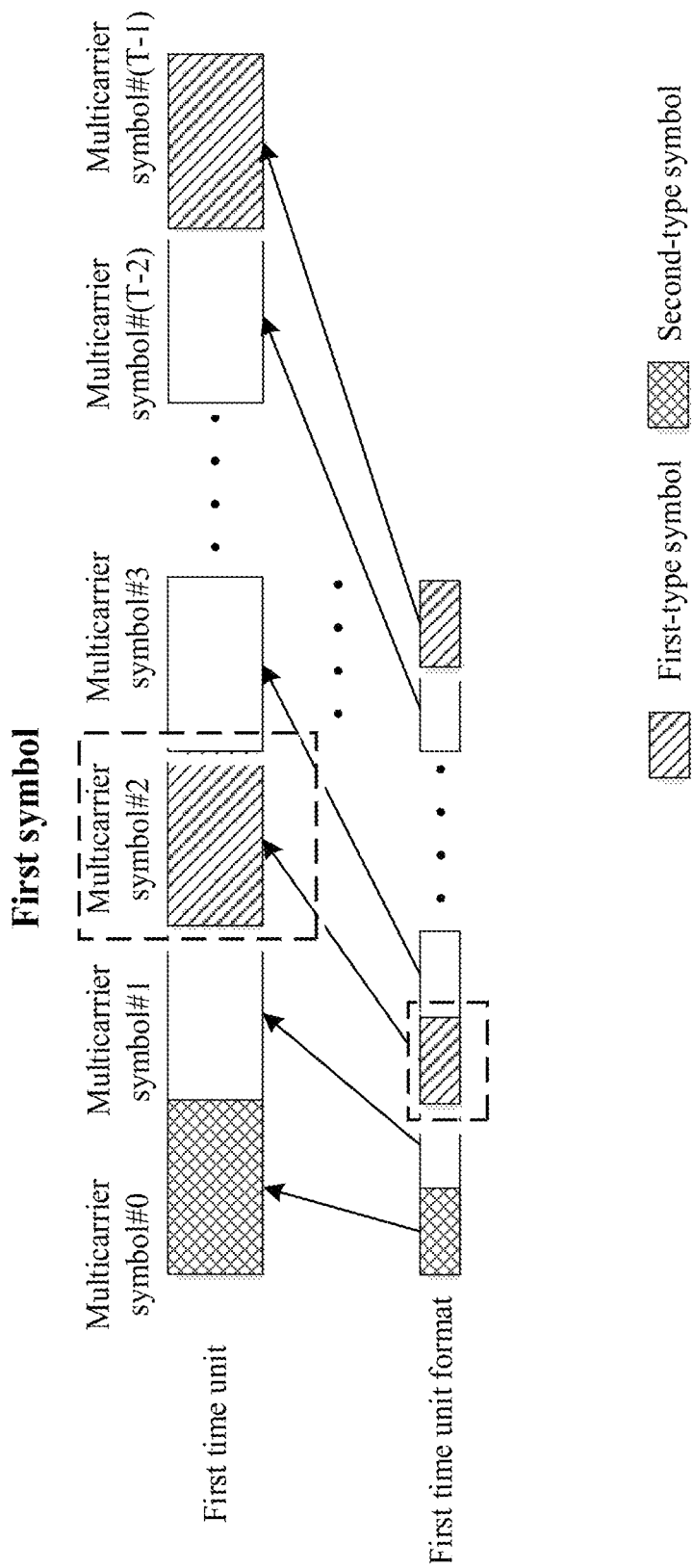
FIG. 8 illustrates a schematic diagram of a relation between a first time unit and a first time-unit format according to one embodiment of the present disclosure.

Embodiment 8 illustrates a schematic diagram of a relation between a first time unit and a first time-unit format according to one embodiment of the present disclosure, as shown in FIG. 8. In FIG. 8, each solid big box represents a multicarrier symbol comprised in a first time unit, and a solid big box in a dotted-line box represents a first symbol in the present disclosure; each solid small box represents a symbol type comprised in the first time-unit format, a solid small box filled with slashes in the first time-unit format represents a first-type symbol in the present disclosure, a solid small box filled with cross lines in the first time-unit format represents a second-type symbol in the present disclosure, and a solid small box in a dotted box represents a symbol type corresponding to the first symbol in the first time-unit format.

In Embodiment 8, a first time unit is any of the Q first-type time-domain-resource blocks, the first time unit comprising T multicarrier symbol(s), T being a positive integer; a first symbol is one of the T multicarrier symbol(s) comprised in the first time unit; a first time-unit format comprises T symbol type(s), any of the T symbol type(s) being one of a first-type symbol or a second-type symbol; and a first time-unit format is used for indicating a symbol type of the first symbol.

In one embodiment, the T symbol types are sequentially arranged in the first time-unit format.

In one embodiment, the first time-unit format is used for indicating a transmission format of a first time unit.

In one embodiment, the first time unit comprises a positive integer number of slot(s).

In one embodiment, the first time unit comprises a slot.

In one embodiment, the first time unit comprises a positive integer number of mini-slot(s).

In one embodiment, the first time unit comprises a mini-slot.

In one embodiment, the first time unit comprises a positive integer number of short-slot(s).

In one embodiment, the first time unit comprises a short-slot.

In one embodiment, the first time unit comprises a positive integer number of subframe(s).

In one embodiment, the first time unit comprises a positive integer number of half-frame(s).

In one embodiment, the first time unit comprises a positive integer number of radio frame(s).

In one embodiment, the first time unit comprises a positive integer number of multicarrier symbol(s).

In one embodiment, the first time unit comprises 14 multicarrier symbols.

In one embodiment, the first time unit comprises 1 multicarrier symbol.

In one embodiment, the first time-unit format comprises the first-type symbol.

In one embodiment, the first time-unit format comprises the second-type symbol.

In one embodiment, the first time-unit format comprises the first-type symbol and the second-type symbol.

In one embodiment, the first time-unit format only comprises the first-type symbol.

In one embodiment, the first time-unit format only comprises the second-type symbol.

In one embodiment, the first time-unit format only comprises the first-type symbol and the second-type symbol.

In one embodiment, the first time-unit format comprises a symbol type other than the first-type symbol and the second-type symbol.

In one embodiment, at least one of the T symbol type(s) comprised in the first time-unit format is the first-type symbol.

In one embodiment, at least one of the T symbol type(s) comprised in the first time-unit format is the second-type symbol.

In one embodiment, all of the T symbol type(s) comprised in the first time-unit format is(are) the first-type symbol(s).

In one embodiment, all of the T symbol type(s) comprised in the first time-unit format is(are) the second-type symbol(s).

In one embodiment, the first time-unit format comprises a third-type symbol.

In one embodiment, the first time-unit format comprises the first-type symbol and the third-type symbol.

In one embodiment, the first time-unit format comprises the second-type symbol and the third-type symbol.

In one embodiment, at least one of the T symbol type(s) comprised in the first time-unit format is the third-type symbol.

In one embodiment, all of the T symbol type(s) comprised in the first time-unit format is(are) the third-type symbol(s).

In one embodiment, at least one of the T symbol types comprised in the first time-unit format is the first-type symbol, and at least one of the T symbol types comprised in the first time-unit format is the second-type symbol.

In one embodiment, at least one of the T symbol types comprised in the first time-unit format is the first-type symbol, and at least one of the T symbol types comprised in the first time-unit format is the third-type symbol.

In one embodiment, at least one of the T symbol types comprised in the first time-unit format is the second-type symbol, and at least one of the T symbol types comprised in the first time-unit format is the third-type symbol.

In one embodiment, at least one of the T symbol types comprised in the first time-unit format is the first-type symbol, at least one of the T symbol types comprised in the first time-unit format is the second-type symbol, and at least one of the T symbol types comprised in the first time-unit format is the third-type symbol.

In one embodiment, the first time-unit format is used for indicating the first-type symbol in the first time unit.

In one embodiment, the first time-unit format is used for indicating the second-type symbol in the first time unit.

In one embodiment, the first time-unit format is used for indicating the third-type symbol in the first time unit.

In one embodiment, the first time-unit format is used for indicating the first-type symbol and the second-type symbol in the first time unit.

In one embodiment, the first time-unit format is used for indicating the first-type symbol, the second-type symbol and the third-type symbol in the first time unit.

In one embodiment, the first time-unit format is used for indicating a distribution of the first-type symbol and the second-type symbol in the first time unit.

In one embodiment, the first time-unit format is used for indicating a position of the first-type symbol in the first time unit.

In one embodiment, the first time-unit format is used for indicating a position of the second-type symbol in the first time unit.

In one embodiment, the first time-unit format is used for indicating a position of the third-type symbol in the first time unit.

In one embodiment, the first time-unit format indicates a position of the first-type symbol in the first time unit and a position of the second-type symbol in the first time unit.

In one embodiment, the first time-unit format indicates a position of the first-type symbol in the first time unit, a position of the second-type symbol in the first time unit, and a position of the third-type symbol in the first time unit.

In one embodiment, the first time-unit format indicates a number of the first-type symbols in the first time unit.

In one embodiment, the first time-unit format indicates a number of the second-type symbols in the first time unit.

In one embodiment, the first time-unit format indicates a number of the third-type symbols in the first time unit.

In one embodiment, the first time-unit format indicates a number of the first-type symbols in the first time unit and a number of the second-type symbols in the first time unit.

In one embodiment, the first time-unit format indicates a number of the first-type symbols in the first time unit, a number of the second-type symbols in the first time unit, and a number of the third-type symbols in the first time unit.

In one embodiment, the first time-unit format comprises a slot format.

In one embodiment, a definition of the slot format refers to 3GPP TS38.213, chapter 11.1.

In one embodiment, the first time-unit format comprises a UL-DL-Pattern.

In one embodiment, a definition of the UL-DL-Pattern refers to the description of TDD-UL-DL-Pattern in 3GPP TS38.331, chapter 6. 3. 2.

In one embodiment, the first time-unit format is a field in the first information.

In one embodiment, the first time-unit format corresponds to a positive integer number of bit(s) in the first information.

In one embodiment, the first time-unit format is a field in a dynamic signaling.

In one embodiment, the first time-unit format is a field in SCI.

In one embodiment, the first time-unit format is a field in a semi-persistent signaling.

In one embodiment, the first time-unit format is a field in an RRC IE.

In one embodiment, the first time-unit format indicates a type of any multicarrier symbol in the first time unit.

In one embodiment, the first time-unit format indicates whether any multicarrier symbol in the first time unit is a first-type symbol.

In one embodiment, the first time-unit format indicates whether any multicarrier symbol in the first time unit is a second-type symbol.

In one embodiment, the first time-unit format indicates whether any multicarrier symbol in the first time unit is a third-type symbol.

In one embodiment, the first symbol is one of the positive integer number of multicarrier symbol(s) comprised in the first time unit.

In one embodiment, the first time unit is one of the Q first-type time-domain-resource blocks comprised in the first time window.

In one embodiment, the first time-unit format indicates whether the first symbol is the first-type symbol.

In one embodiment, the first time-unit format indicates whether the first symbol is the second-type symbol.

In one embodiment, the first time-unit format indicates whether the first symbol is the third-type symbol.

In one embodiment, any of the positive integer number of multicarrier symbol(s) comprised in the first time unit corresponds to one of the first-type symbol or the second-type symbol in the first time-unit format.

In one embodiment, any of the positive integer number of multicarrier symbol(s) comprised in the first time unit corresponds to one among the first-type symbol, the second-type symbol and the third-type symbol in the first time-unit format.

In one embodiment, at least one of the positive integer number of multicarrier symbol(s) comprised in the first time unit corresponds to the first-type symbol in the first time-unit format.

In one embodiment, at least one of the positive integer number of multicarrier symbol(s) comprised in the first time unit corresponds to the second-type symbol in the first time-unit format.

In one embodiment, at least one of the positive integer number of multicarrier symbol(s) comprised in the first time unit corresponds to the third-type symbol in the first time-unit format.

In one embodiment, all of the positive integer number of multicarrier symbol(s) comprised in the first time unit correspond(s) to the first-type symbol in the first time-unit format.

In one embodiment, all of the positive integer number of multicarrier symbol(s) comprised in the first time unit correspond(s) to the second-type symbol in the first time-unit format.

In one embodiment, all of the positive integer number of multicarrier symbol(s) comprised in the first time unit correspond(s) to the third-type symbol in the first time-unit format.

In one embodiment, the first symbol in the first time unit corresponds to the first-type symbol in the first time-unit format, the first symbol belonging to the first-type symbol.

In one embodiment, the first symbol in the first time unit corresponds to the second-type symbol in the first time-unit format, the first symbol belonging to the second-type symbol.

In one embodiment, the first symbol in the first time unit corresponds to the third-type symbol in the first time-unit format, the first symbol belonging to the third-type symbol.

In one embodiment, the first-type symbol comprises an uplink symbol.

In one embodiment, the first-type symbol comprises a flexible symbol.

In one embodiment, the second-type symbol comprises a downlink symbol.

In one embodiment, the second-type symbol comprises a flexible symbol.

In one embodiment, the first-type symbol comprises a flexible symbol, and the second-type symbol does not comprise a flexible symbol.

In one embodiment, the first-type symbol does not comprise a flexible symbol, and the second-type symbol comprises a flexible symbol.

In one embodiment, the first-type symbol comprises an uplink symbol, and the first-type symbol does not comprise a flexible symbol.

In one embodiment, the second-type symbol comprises a downlink symbol, and the second-type symbol does not comprise a flexible symbol.

In one embodiment, the third-type symbol comprises a flexible symbol.

In one embodiment, the third-type symbol only comprises a flexible symbol.

In one embodiment, the third-type symbol comprises a flexible symbol, the third-type symbol does not comprise an uplink symbol, and the third-type symbol does not comprise a downlink symbol.

In one embodiment, a definition of the uplink symbol refers to 3GPP TS38. 213, chapter 11.1.

In one embodiment, a definition of the downlink symbol refers to 3GPP TS38. 213, chapter 11.1.

In one embodiment, a definition of the flexible symbol refers to 3GPP TS38. 213, chapter 11.1.

In one embodiment, when the first symbol belongs to the first-type symbol, the first symbol is used for uplink transmissions.

In one embodiment, when the first symbol belongs to the first-type symbol, the first symbol is used for sidelink transmissions.

In one embodiment, when the first symbol belongs to the first-type symbol, the first symbol can be used for both uplink transmissions and sidelink transmissions.

In one embodiment, when the first symbol belongs to the first-type symbol, the first symbol is used for uplink transmissions, or the one multicarrier symbol is used for sidelink transmissions.

In one embodiment, when the first symbol belongs to the second-type symbol, the first symbol is used for downlink transmissions.

In one embodiment, when the first symbol belongs to the second-type symbol, the first symbol is not used for sidelink transmissions.

In one embodiment, when the first symbol belongs to the first-type symbol, the first symbol is used for a PC5 interface.

In one embodiment, when the first symbol belongs to the first-type symbol, the first symbol is used for a Uu interface, or, the first symbol is used for a PC5 interface.

In one embodiment, when the first symbol belongs to the first-type symbol, the first symbol can be used for both a Uu interface and a PC5 interface.

In one embodiment, when the first symbol belongs to the second-type symbol, the first symbol is used for a Uu interface.

In one embodiment, when the first symbol belongs to the second-type symbol, the first symbol is only used for a Uu interface.

In one embodiment, when the first symbol belongs to the first-type symbol, the first symbol is a Discrete Fourier Transform Spread Orthogonal Frequency Division Multiplexing (DFT-S-OFDM) symbol.

In one embodiment, when the first symbol belongs to the first-type symbol, the first symbol is a Single-Carrier Frequency Division Multiple Access (SC-FDMA) symbol.

In one embodiment, when the first symbol belongs to the second-type symbol, the first symbol is an Orthogonal Frequency Division Multiplexing (OFDM) symbol.

In one embodiment, when the first symbol is the second-type symbol, the first symbol is a FBMC symbol.

In one embodiment, when the first symbol is the first-type symbol, the first symbol is used for uplink transmissions.

In one embodiment, when the first symbol is the first-type symbol, the first symbol is used for sidelink transmissions.

In one embodiment, when the first symbol is the first-type symbol, the first symbol can be used for both uplink transmissions and sidelink transmissions.

In one embodiment, when the first symbol is the first-type symbol, the first symbol is used for uplink transmissions, or, the one multicarrier symbol is used for sidelink transmissions.

In one embodiment, when the first symbol is the second-type symbol, the first symbol is used for downlink transmissions.

In one embodiment, when the first symbol is the second-type symbol, the first symbol is not used for sidelink transmissions.

In one embodiment, when the first symbol is the first-type symbol, the first symbol is used for a PC5 interface.

In one embodiment, when the first symbol is the first-type symbol, the first symbol is used for a Uu interface, or, the first symbol is used for a PC5 interface.

In one embodiment, when the first symbol is the first-type symbol, the first symbol can be used for both a Uu interface and a PC5 interface.

In one embodiment, when the first symbol is the second-type symbol, the first symbol is used for a Uu interface.

In one embodiment, when the first symbol is the second-type symbol, the first symbol is only used for a Uu interface.

In one embodiment, when the first symbol is the first-type symbol, the first symbol is a DFT-S-OFDM symbol.

In one embodiment, when the first symbol is the first-type symbol, the first symbol is a SC-FDMA symbol.

In one embodiment, when the first symbol is the second-type symbol, the first symbol is an OFDM symbol.

In one embodiment, when the first symbol is the second-type symbol, the first symbol is a FBMC symbol.

Embodiment 9

Figure 9:
FIG. 9 illustrates a schematic diagram of relations among a first time-unit format, a time-unit-format subset, and a time-unit-format list according to one embodiment of the present disclosure.
Figure 9:
Figure 9:
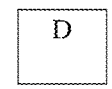
Figure 9:
Figure 9:
Figure 9:

Embodiment 9 illustrates a schematic diagram of relations among a first time-unit format, a time-unit-format subset, and a time-unit-format list according to one embodiment of the present disclosure, as shown in FIG. 9. In FIG. 9, each row represents a first-type time-unit format in a time-unit-format list, and each first-type time-unit format comprises T symbol(s); in case A, a square filled with "U" represents a first-type symbol in the present disclosure, and a square filled with "D" or "F" represents a second-type symbol in the present disclosure; in case B, a square filled with "U" or "F" represents a first-type symbol in the present disclosure, and a square filled with "D" represents a second-type symbol in the present disclosure; a first-type time-unit format in a dotted big box is the first time-unit format in the present disclosure.

In Embodiment 9, a time-unit-format list comprises a positive integer number of first-type time-unit format(s), and the first time-unit format is one of the positive integer number of first-type time-unit format(s) comprised in the time-unit-format list; a time-unit-format subset comprises a positive integer number of first-type time-unit format(s) among the time-unit-format list.

In one embodiment, the time-unit-format list comprises a positive integer number of first-type time-unit format(s), any of the positive integer number of first-type time-unit format(s) comprises T symbol(s), T being a positive integer.

In one embodiment, the T is equal to 14.

In one embodiment, the T is equal to 7.

In one embodiment, the time-unit-format list comprises 56 first-type time-unit formats.

In one embodiment, the time-unit-format list comprises 57 first-type time-unit formats.

In one embodiment, the time-unit-format list is pre-defined.

In one embodiment, the time-unit-format list is preconfigured.

In one embodiment, the time-unit-format list is configured by a higher-layer signaling.

In one embodiment, the time-unit-format list is referred based on a higher-layer signaling.

In one embodiment, a definition of the time-unit-format list refers to 3GPP TS38. 213, chapter 11.1.1, form 11.1.1-1.

In one embodiment, the time-unit-format list comprises a positive integer number of first-type time-unit format(s) that respectively correspond(s) to a positive integer number of first-type format index(es), and a first format index is one of the positive integer number of first-type format index(es), the first format index corresponding to the first time-unit format.

In one embodiment, the positive integer number of first-type format indexes are positive integer number of non-negative integers arranged in order.

In one embodiment, the positive integer number of first-type index(es) is(are) respectively used to indicate the positive integer number of first-type time-unit format(s) comprised in the time-unit-format list.

In one embodiment, any of the positive integer number of first-type format index(es) is used for indicating one of the positive integer number of first-type time unit(s) comprised in the time-unit-format list.

In one embodiment, the first format index is used for indicating a first time-unit format.

In one embodiment, the first format index is used for indicating the first time-unit format out of the time-unit-format list.

In one embodiment, the time-unit-format list comprises M first-type time-unit format(s), and the time-unit-format subset comprises M1 first-type time-unit format(s); any of the M1 first-type time-unit format(s) comprised in the time-unit-format subset is one of the M first-type time-unit format(s) comprised in the time-unit-format list, M being a positive integer, M1 being a positive integer not greater than the M.

In one embodiment, a first target time unit is any of the M1 first-type time-unit format(s) comprised in the time-unit-format subset.

In one embodiment, a first target time-unit format comprises a positive integer number of multicarrier symbol(s), and any of X0 multicarrier symbol(s) is one of the positive integer number of multicarrier symbol(s) comprised in the first target time-domain unit format, the X0 multicarrier symbol(s) all being first type symbol(s), X0 being a non-negative integer not greater than the T.

In one embodiment, the X0 multicarrier symbols are discrete in the first target time-unit format.

In one embodiment, the X0 multicarrier symbols are consecutive in the first target time-unit format.

In one embodiment, the X0 is equal to 0.

In one embodiment, the X0 is equal to 1.

In one embodiment, the X0 is equal to 2.

In one embodiment, the X0 is less than a first threshold.

In one embodiment, a second target time unit is any of the M1 first-type time-unit format(s) comprised in the time-unit-format subset.

In one embodiment, a second target time-unit format comprises a positive integer number of multicarrier symbol(s), a second target time-unit format comprises a positive integer number of multicarrier symbol(s) respectively corresponding to a positive integer number of symbol index(es); a second target symbol is one of the positive integer number of multicarrier symbol(s) comprised in the second target time-unit format, and a second symbol index is one of the positive integer number of symbol index(es) corresponding to the second target symbol.

In one embodiment, the positive integer number of symbol indexes are a positive integer number of non-negative integers arranged in order.

In one embodiment, the second target symbol is not the first-type symbol.

In one embodiment, the second target symbol is the second-type symbol.

In one embodiment, the second target symbol is the third-type symbol.

In one embodiment, the second symbol index is equal to a first given symbol index.

In one embodiment, the first given symbol index is 0.

In one embodiment, the first given symbol index is 1.

In one embodiment, the first time-unit format is used for determining whether the first candidate time-domain-resource block belongs to the first time-domain-resource-block subset.

In one embodiment, when the first time-unit format belongs to the time-unit-format subset, the first candidate time-domain-resource block does not belong to the first time-domain-resource-block subset.

In one embodiment, when the first time-unit format does not belong to the time-unit-format subset, the first candidate time-domain-resource block belongs to the first time-domain-resource-block subset.

In one embodiment, when the first time-unit format does not belong to the time-unit-format subset, the first candidate time-domain-resource block does not belong to the first time-domain-resource-block subset.

In one embodiment, when the time-unit-format subset comprises the first time-unit format, the first candidate time-domain-resource block does not belong to the first time-domain-resource-block subset.

In one embodiment, when the time-unit-format subset comprises the first time-unit format, the first candidate time-domain-resource block belongs to the first time-domain-resource-block subset.

In one embodiment, when the time-unit-format subset comprises the first time-unit format, the first candidate time-domain-resource block does not belong to the first time-domain-resource-block subset.

In one embodiment, when the first time-unit format is one of M1 first-type time-unit format(s) comprised in the time-unit-format subset, the first candidate time-domain-resource block does not belong to the first time-domain-resource-block sub set.

In one embodiment, when the first time-unit format is not any of M1 first-type time-unit format(s) comprised in the time-unit-format subset, the first candidate time-domain-resource block belongs to the first time-domain-resource-block subset.

In one embodiment, when the first time-unit format is not any of M1 first-type time-unit format(s) comprised in the time-unit-format subset, the first candidate time-domain-resource block does not belong to the first time-domain-resource-block subset.

In one embodiment, the first time-unit format is used for determining whether the second candidate time-domain-resource block belongs to the first resource pool.

In one embodiment, when the first time-unit format belongs to the time-unit-format subset, the second candidate time-domain-resource block does not belong to the first resource pool.

In one embodiment, when the first time-unit format does not belong to the time-unit-format subset, the second candidate time-domain-resource block belongs to the first resource pool.

In one embodiment, when the first time-unit format does not belong to the time-unit-format subset, the second candidate time-domain-resource block does not belong to the first resource pool.

In one embodiment, when the time-unit-format subset comprises the first time-unit format, the second candidate time-domain-resource block does not belong to the first resource pool.

In one embodiment, when the time-unit-format subset comprises the first time-unit format, the second candidate time-domain-resource block belongs to the first resource pool.

In one embodiment, when the time-unit-format subset comprises the first time-unit format, the second candidate time-domain-resource block does not belong to the first resource pool.

In one embodiment, when the first time-unit format is one of M1 first-type time-unit format(s) comprised in the time-unit-format subset, the second candidate time-domain-resource block does not belong to the first resource pool.

In one embodiment, when the first time-unit format is not any of M1 first-type time-unit format(s) comprised in the time-unit-format subset, the second candidate time-domain-resource block belongs to the first resource pool.

In one embodiment, when the first time-unit format is not any of M1 first-type time-unit format(s) comprised in the time-unit-format subset, the second candidate time-domain-resource block does not belong to the first resource pool.

Embodiment 10

Figure 10:
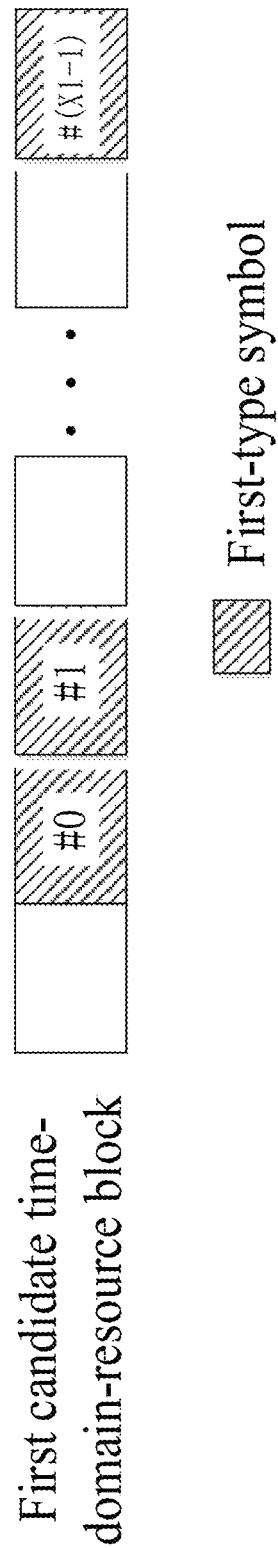
FIG. 10 illustrates a schematic diagram of a relation between a first candidate time-domain-resource block and X1 first-type symbol(s) according to one embodiment of the present disclosure.

Embodiment 10 illustrates a schematic diagram of a relation between a first candidate time-domain-resource block and X1 first-type symbol(s) according to one embodiment of the present disclosure, as shown in FIG. 10. In FIG. 10, each h solid box represents one of a positive integer number of multicarrier symbol(s) comprised in a first candidate time-domain-resource block; a solid box filled with slashes represents the first-type symbol in the present disclosure.

In Embodiment 10, the first candidate time-domain-resource block in the present disclosure comprises a positive integer number of multicarrier symbol(s), and X1 multicarrier symbol(s) comprised in the first candidate time-domain-resource block is(are) a first-type symbol (first-type symbols).

In one embodiment, any of the X1 first-type symbol(s) is one of the positive integer number of multicarrier symbol(s) comprised in the first candidate time-domain-resource block.

In one embodiment, the X1 first-type symbols are consecutive in the first candidate time-domain-resource block.

In one embodiment, the X1 first-type symbols are discrete in the first candidate time-domain-resource block.

In one embodiment, at least two adjacent first-type symbols of the X1 first-type symbols are non-consecutive in the first candidate time-domain-resource block.

In one embodiment, the second candidate time-domain-resource block in the present disclosure comprises a positive integer number of multicarrier symbol(s), and X2 multicarrier symbol(s) comprised in the second candidate time-domain-resource block is(are) a first-type symbol (first-type symbols).

In one embodiment, any of the X2 first-type symbol(s) is one of the positive integer number of multicarrier symbol(s) comprised in the second candidate time-domain-resource block.

In one embodiment, the X2 first-type symbols are consecutive in the second candidate time-domain-resource block.

In one embodiment, the X2 first-type symbols are discrete in the second candidate time-domain-resource block.

In one embodiment, at least two adjacent first-type symbols among the X2 first-type symbols are non-consecutive in the second candidate time-domain-resource block.

Embodiment 11

Figure 11:
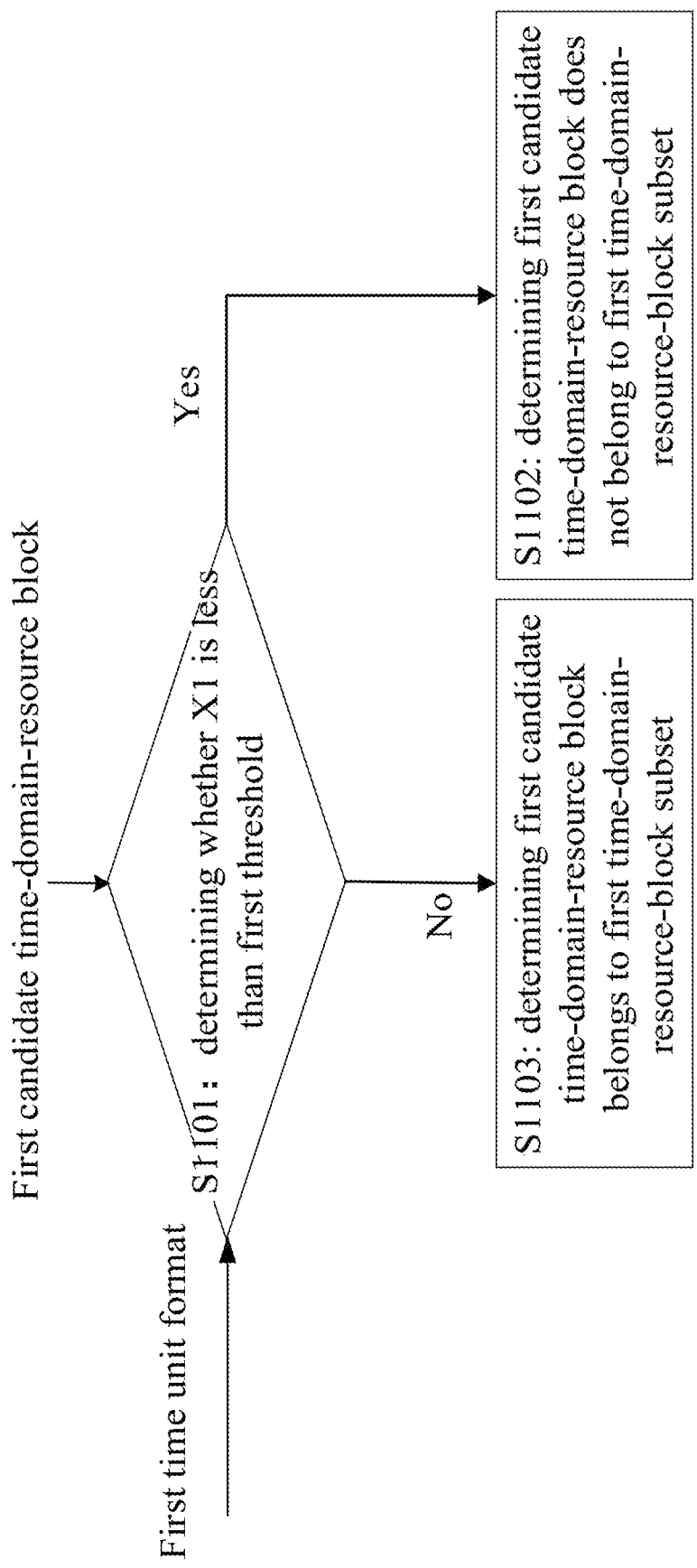
FIG. 11 illustrates a flowchart of determining whether a first candidate time-domain-resource block belongs to a first time-domain-resource-block subset according to one embodiment of the present disclosure.

Embodiment 11 illustrates a flowchart of determining whether a first candidate time-domain-resource block belongs to a first time-domain-resource-block subset according to one embodiment of the present disclosure, as shown in FIG. 11.

In Embodiment 11, X1 is determined whether it is less than a first threshold in step S1101; when the result of determining whether X1 is less than a first threshold is "Yes", step S1102 is performed to determine that a first candidate time-domain-resource block does not belong to a first time-domain-resource-block subset; when the result of determining whether X1 is less than a first threshold is "No", step S1103 is performed to determine that a first candidate time-domain-resource block belongs to a first time-domain-resource-block subset.

In one embodiment, the first threshold is a positive integer.

In one embodiment, the first threshold is 1.

In one embodiment, the first threshold is 3.

In one embodiment, the first threshold is 7.

In one embodiment, the first threshold is 14.

In one embodiment, the first time-unit format is used for determining the X1.

In one embodiment, when the X1 is less than the first threshold, the first candidate resource block does not belong to the first time-domain-resource-block sub set.

In one embodiment, when the X1 is not less than the first threshold, the first candidate resource block belongs to the first time-domain-resource-block subset.

In one embodiment, when the X1 is equal to the first threshold, the first candidate resource block belongs to the first time-domain-resource-block subset.

In one embodiment, when the X1 is greater than the first threshold, the first candidate resource block belongs to the first time-domain-resource-block subset.

In one embodiment, when the X1 is less than the first threshold, the first candidate resource block is not any of the Q1 first-type time-domain-resource block(s) comprised in the first time-domain-resource-block subset.

In one embodiment, when the X1 is not less than the first threshold, the first candidate resource block is one of the Q1 first-type time-domain-resource block(s) comprised in the first time-domain-resource-block subset.

In one embodiment, when the X1 is not less than the first threshold, the first candidate resource block is one of the Q1 first-type time-domain-resource block(s) comprised in the first time-domain-resource-block subset.

In one embodiment, when the X1 is equal to the first threshold, the first candidate resource block is one of the Q1 first-type time-domain-resource block(s) comprised in the first time-domain-resource-block subset.

In one embodiment, when the X1 is greater than the first threshold, the first candidate resource block is one of the Q1 first-type time-domain-resource block(s) comprised in the first time-domain-resource-block subset.

Embodiment 12

Figure 12:
FIG. 12 illustrates a flowchart of determining whether a first candidate time-domain-resource block belongs to a first resource pool according to one embodiment of the present disclosure.

Embodiment 12 illustrates a flowchart of determining whether a first candidate time-domain-resource block belongs to a first resource pool according to one embodiment of the present disclosure, as shown in FIG. 12.

In Embodiment 12, whether a first candidate time-domain-resource block belongs to a first time-domain resource subset is determined in step S1201; when the result of determining whether a first candidate time-domain-resource block belongs to a first time-domain resource subset is "Yes", the step S1202 is performed to determine whether a first bit is a first value; when the result of determining whether a first bit is a first value is "Yes", step S1203 is performed to determine that a first candidate time-domain-resource block belongs to a first resource pool. When the result of determining whether a first candidate time-domain-resource block belongs to a first time-domain resource subset is "No", step S1204 is performed to determine that a first candidate time-domain-resource block does not belong to a first resource pool; when the result of determining whether a first bit is a first value is "No", step S1204 is performed to determine that a first candidate time-domain-resource block does not belong to a first resource pool.

In one embodiment, the phrase that the first candidate time-domain-resource block belongs to the first resource pool refers to that the first candidate time-domain-resource block is one of the Q3 first-type time-domain-resource block(s) comprised in the first resource pool in time domain.

In one embodiment, the phrase that the first candidate time-domain-resource block does not belong to the first resource pool refers to that the first candidate time-domain-resource block is not any of the Q3 first-type time-domain-resource block(s) comprised in the first resource pool in time domain.

In one embodiment, the second information comprises the first bitmap, and the first bitmap comprises B bit(s), B being a positive integer.

In one embodiment, the B bit(s) in the first bitmap correspond(s) to the Q1 first-type time-domain-resource block(s) in the first time-domain-resource-block sub set.

In one embodiment, any of the B bit(s) comprised in the first bitmap corresponds to at least one first-type time-domain-resource block among the first time-domain-resource-block subset.

In one embodiment, the B bit(s) in the first bitmap respectively correspond(s) to the Q1 first-type time-domain-resource block(s) among the first time-domain-resource-block subset, the Q1 being equal to the B.

In one embodiment, the first time-domain-resource-block subset comprises B first-type time-domain-resource block group(s), and any of the B first-type time-domain-resource block group(s) comprises a positive integer number of first-type time-domain-resource block(s).

In one embodiment, any of the Q1 first-type time-domain-resource block(s) comprised in the first time-domain-resource-block subset belongs to one of the B first-type time-domain-resource block group(s).

In one embodiment, the B bit(s) in the first bitmap respectively correspond(s) to the B first-type time-domain-resource block(s) among the first time-domain-resource-block subset.

In one embodiment, a first target time-domain-resource block is one of the Q1 first-type time-domain-resource block(s) comprised in the first time-domain-resource-block subset, and a first bit is one of the B bit(s) comprised in the first bitmap corresponding to the first target time-domain-resource block.

In one embodiment, when a value of the first bit is a first value, the first target time-domain-resource block belongs to the first resource pool.

In one embodiment, when a value of the first bit is a second value, the first target time-domain-resource block does not belong to the first resource pool.

In one embodiment, the phrase that the first target time-domain-resource block belongs to the first resource pool refers to that the first target time-domain-resource block is one of the Q3 first-type time-domain-resource block(s) comprised in the first resource block in time domain.

In one embodiment, the phrase that the first target time-domain-resource block does not belong to the first resource pool refers to that the first target time-domain-resource block is not any of the Q3 first-type time-domain-resource block(s) comprised in the first resource block in time domain.

In one embodiment, a first target time-domain-resource block group is one of the B first-type time-domain-resource block group(s) comprised in the first time-domain-resource-block subset, a first bit is one of the B bit(s) comprised in the first bitmap corresponding to the first target time-domain-resource block group, and the first target time-domain-resource block group comprises a positive integer number of first-type time-domain-resource block(s).

In one embodiment, when a value of the first bit is a first value, any first-type time-domain-resource block among the first target time-domain-resource block group belongs to the first resource pool.

In one embodiment, when a value of the first bit is a second value, any first-type time-domain-resource block among the first target time-domain-resource block group does not belong to the first resource pool.

In one embodiment, the phrase that any first-type time-domain-resource block among the first target time-domain-resource block group belongs to the first resource pool refers to that any first-type time-domain resource among the first target time-domain-resource block group is one of the Q3 first-type time-domain-resource block(s) comprised in the first resource block in time domain.

In one embodiment, the phrase that any first-type time-domain-resource block among the first target time-domain-resource block group does not belong to the first resource pool refers to that any first-type time-domain resource of the first target time-domain-resource block group is not any of the Q3 first-type time-domain-resource block(s) comprised in the first resource block in time domain.

In one embodiment, the first value is 1 and the second value is 0.

In one embodiment, the first value is 1 and the second value is −1.

In one embodiment, the first value is a Boolean value "TRUE".

In one embodiment, the second value is a Boolean value "FALSE".

Embodiment 13

Figure 13:
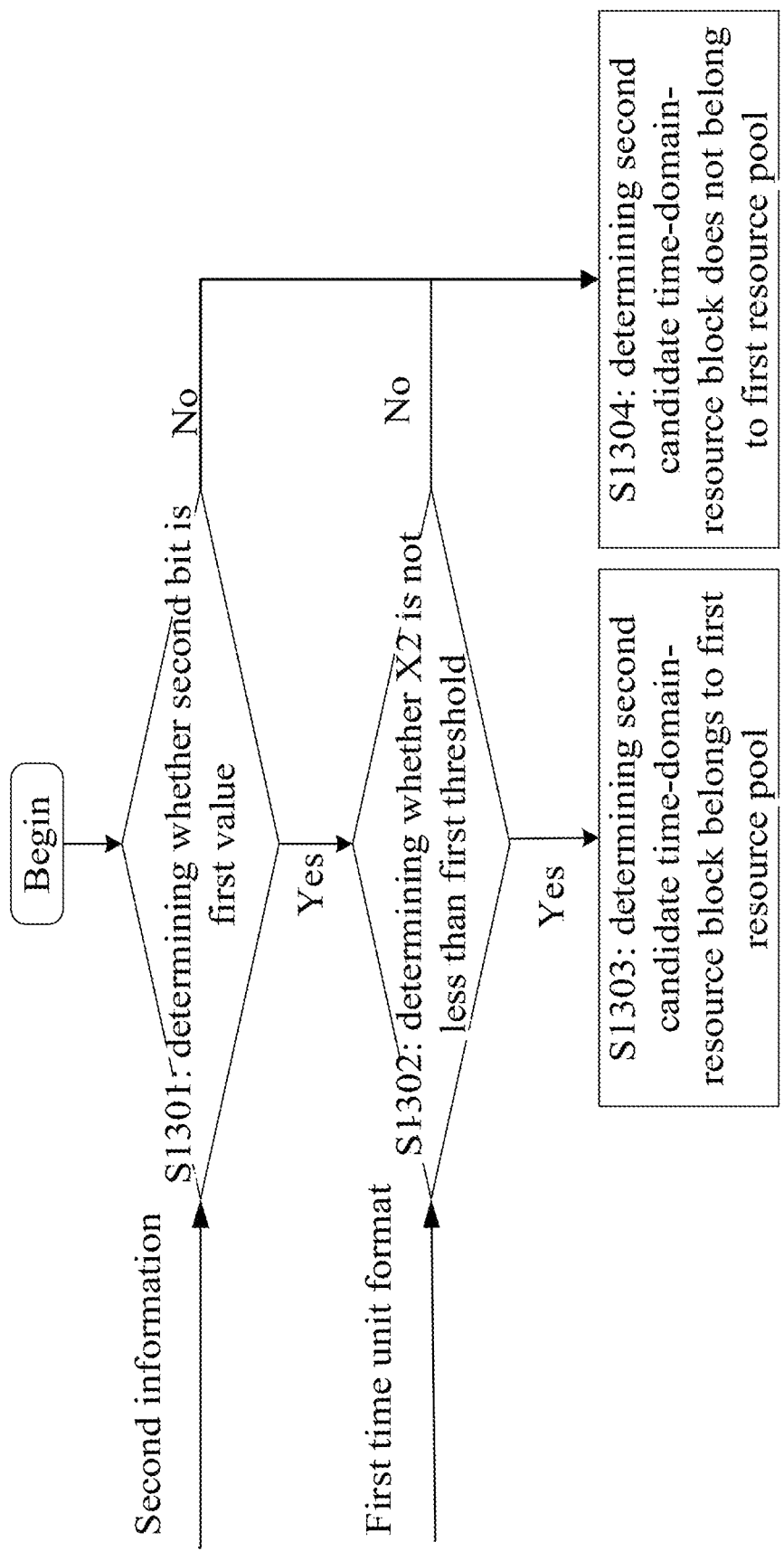
FIG. 13 illustrates a flowchart of determining whether a second candidate time-domain-resource block belongs to a first resource pool according to one embodiment of the present disclosure.

Embodiment 13 illustrates a flowchart of determining whether a second candidate time-domain-resource block belongs to a first resource pool according to one embodiment of the present disclosure, as shown in FIG. 13.

In Embodiment 13, whether a second bit is a first value is determined in step S1301; when the result of determining whether a second bit is a first value is "Yes", step S1302 is performed to determine whether X2 is not less than a first threshold; when the result of determining whether X2 is not less than a first threshold is "Yes", step S1303 is performed to determine that a second candidate time-domain-resource block belongs to a first resource pool; when the result of determining whether a second bit is a first value is "No", step S1304 is performed to determine that a second candidate time-domain-resource block does not belong to a first resource pool; when the result of determining whether X2 is not less than a first threshold is "No", step S1304 is performed to determine that a second candidate time-domain-resource block does not belong to a first resource pool;

In one embodiment, the phrase that the second candidate time-domain-resource block belongs to the first resource pool refers to that the second candidate time-domain-resource block is one of the Q3 first-type time-domain-resource block(s) comprised in the first resource pool in time domain.

In one embodiment, the phrase that the second candidate time-domain-resource block does not belong to the first resource pool refers to that the first candidate time-domain-resource block is not any of the Q3 first-type time-domain-resource block(s) comprised in the first resource pool in time domain.

In one embodiment, a second candidate time-domain-resource block is one of the Q1 first-type time-domain-resource block(s) comprised in the first time-domain-resource-block subset, and a second bit is one of the B bit(s) comprised in the first bitmap corresponding to the second candidate time-domain-resource block.

In one embodiment, when a value of the second bit is a first value and the X2 is not less than the first threshold, the second candidate time-domain-resource block belongs to the first resource pool.

In one embodiment, when a value of the second bit is a first value and the X2 is equal to the first threshold, the second candidate time-domain-resource block belongs to the first resource pool.

In one embodiment, when a value of the second bit is a first value and the X2 is greater than the first threshold, the second candidate time-domain-resource block belongs to the first resource pool.

In one embodiment, when a value of the second bit is a second value, the second candidate time-domain-resource block does not belong to the first resource pool.

In one embodiment, when a value of the second bit is a second value and the X2 is not less than the first threshold, the second candidate time-domain-resource block does not belong to the first resource pool.

In one embodiment, when a value of the second bit is a second value and the X2 is less than the first threshold, the second candidate time-domain-resource block does not belong to the first resource pool.

In one embodiment, when the X2 is less than the first threshold, the second candidate time-domain-resource block does not belong to the first resource pool.

In one embodiment, when a value of the second bit is a first value and the X2 is less than the first threshold, the second candidate time-domain-resource block does not belong to the first resource pool.

In one embodiment, a second target time-domain-resource block group is one of the B first-type time-domain-resource block group(s) comprised in the first time-domain-resource-block subset, a second bit is one of the B bit(s)

comprised in the first bitmap corresponding to the second target time-domain-resource block group, the second target time-domain-resource block group comprises a positive integer number of first-type time-domain-resource block(s), and the second candidate time-domain-resource block is a first-type time-domain-resource block among the second target time-domain-resource block group.

In one embodiment, when a value of the second bit is a second value, any first-type time-domain-resource block among the second target time-domain-resource block group does not belong to the first resource pool.

Embodiment 14

Figure 14:
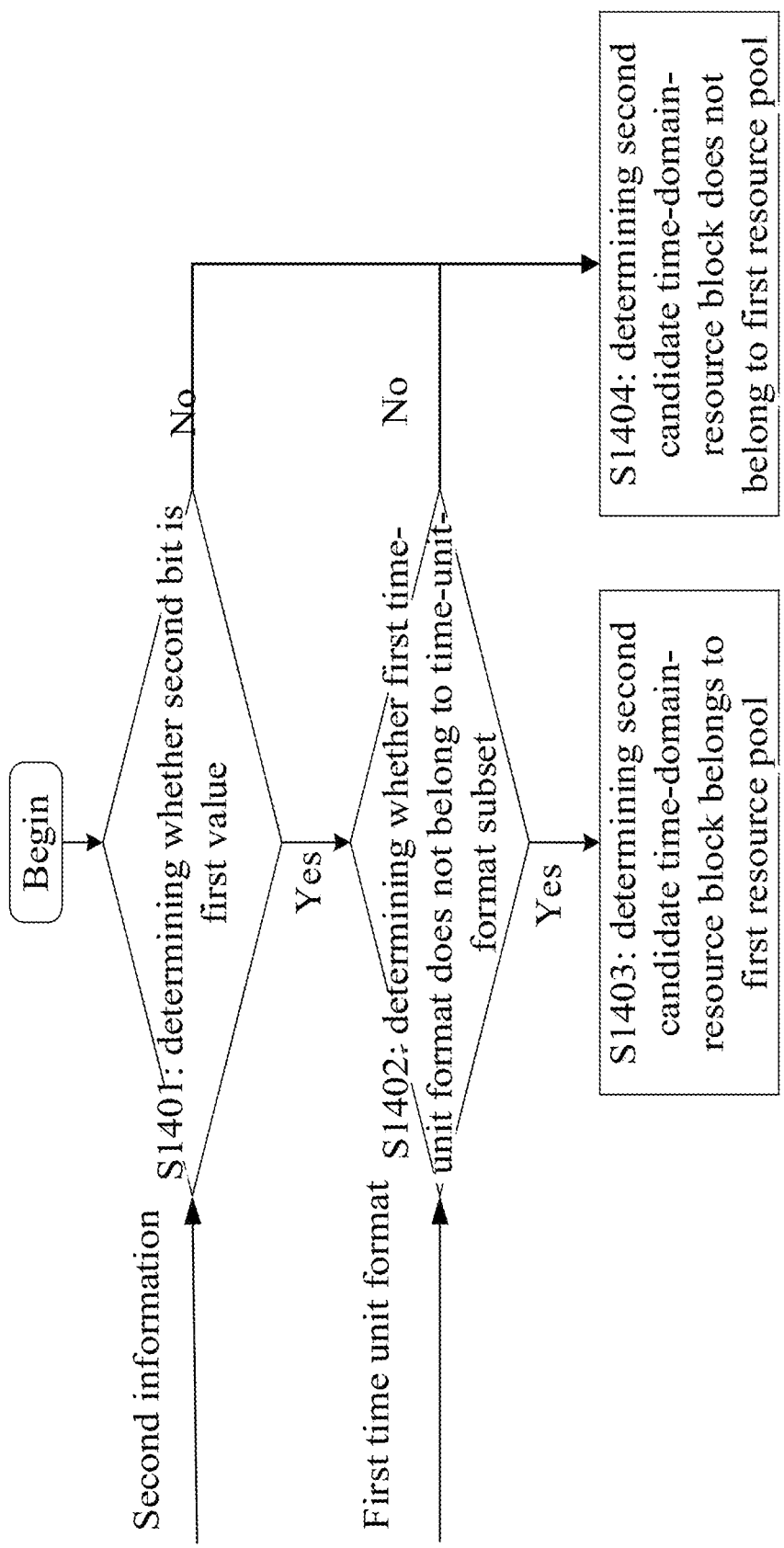
FIG. 14 illustrates a flowchart of determining whether a second candidate time-domain-resource block belongs to a first resource pool according to one embodiment of the present disclosure.

Embodiment 14 illustrates a flowchart of determining whether a second candidate time-domain-resource block belongs to a first resource pool according to one embodiment of the present disclosure, as shown in FIG. 14.

In Embodiment 14, whether a second bit is a first value is determined in step S1401; when the result of determining whether a second bit is the first value is "Yes", step S1402 is performed to determine whether a first time-unit format does not belong to a time-unit-format subset; when the result of determining whether a first time-unit format does not belong to a time-unit-format subset is "Yes", step S1403 is performed to determine that a second candidate time-domain-resource block belongs to a first resource pool; when the result of determining whether a second bit is a first value is "No", step S1404 is performed to determine that a second candidate time-domain-resource block does not belong to a first resource pool; when the result of determining whether a first time-unit format does not belong to a time-unit-format subset is "No", step S1404 is performed to determine that a second candidate time-domain-resource block does not belong to a first resource pool.

In one embodiment, when a value of the second bit is a first value and the first time-unit format does not belong to the time-unit-format subset, the second candidate time-domain-resource block belongs to the first resource pool.

In one embodiment, when a value of the second bit is a first value and the time-unit-format subset does not comprise the first time-unit format, the second candidate time-domain-resource block belongs to the first resource pool.

In one embodiment, when a value of the second bit is a second value and the first time-unit format belongs to the time-unit-format subset, the second candidate time-domain-resource block does not belong to the first resource pool.

In one embodiment, when a value of the second bit is a second value and the first time-unit format does not belong to the time-unit-format subset, the second candidate time-domain-resource block does not belong to the first resource pool.

In one embodiment, when the first time-unit format belongs to the time-unit-format subset, the second candidate time-domain-resource block does not belong to the first resource pool.

In one embodiment, when a value of the second bit is a first value and the first time-unit format belongs to the time-unit-format subset, the second candidate time-domain-resource block does not belong to the first resource pool.

Embodiment 15

Figure 15:
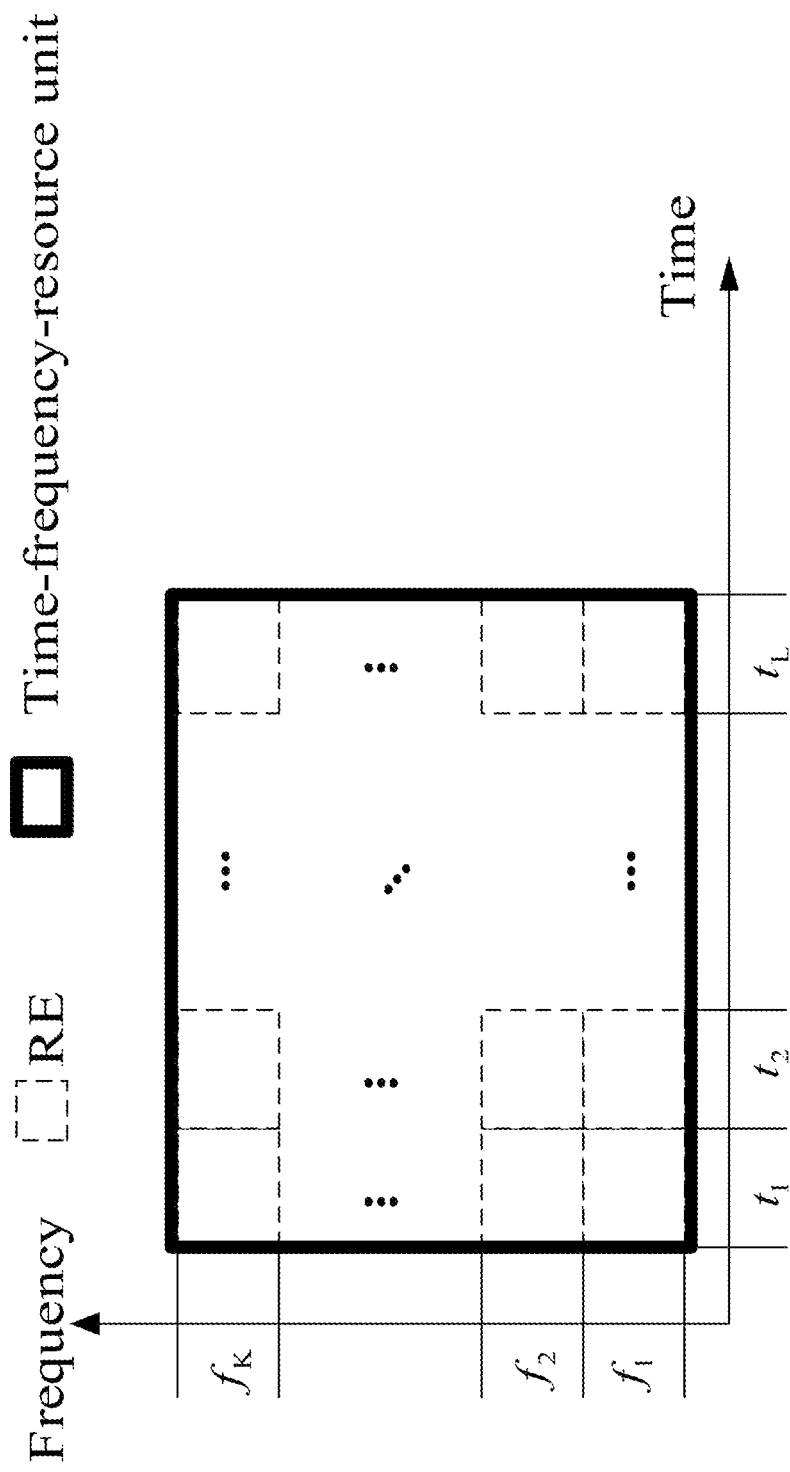
FIG. 15 illustrates a schematic diagram of a time-frequency resource unit according to one embodiment of the present disclosure.
Figure 16:
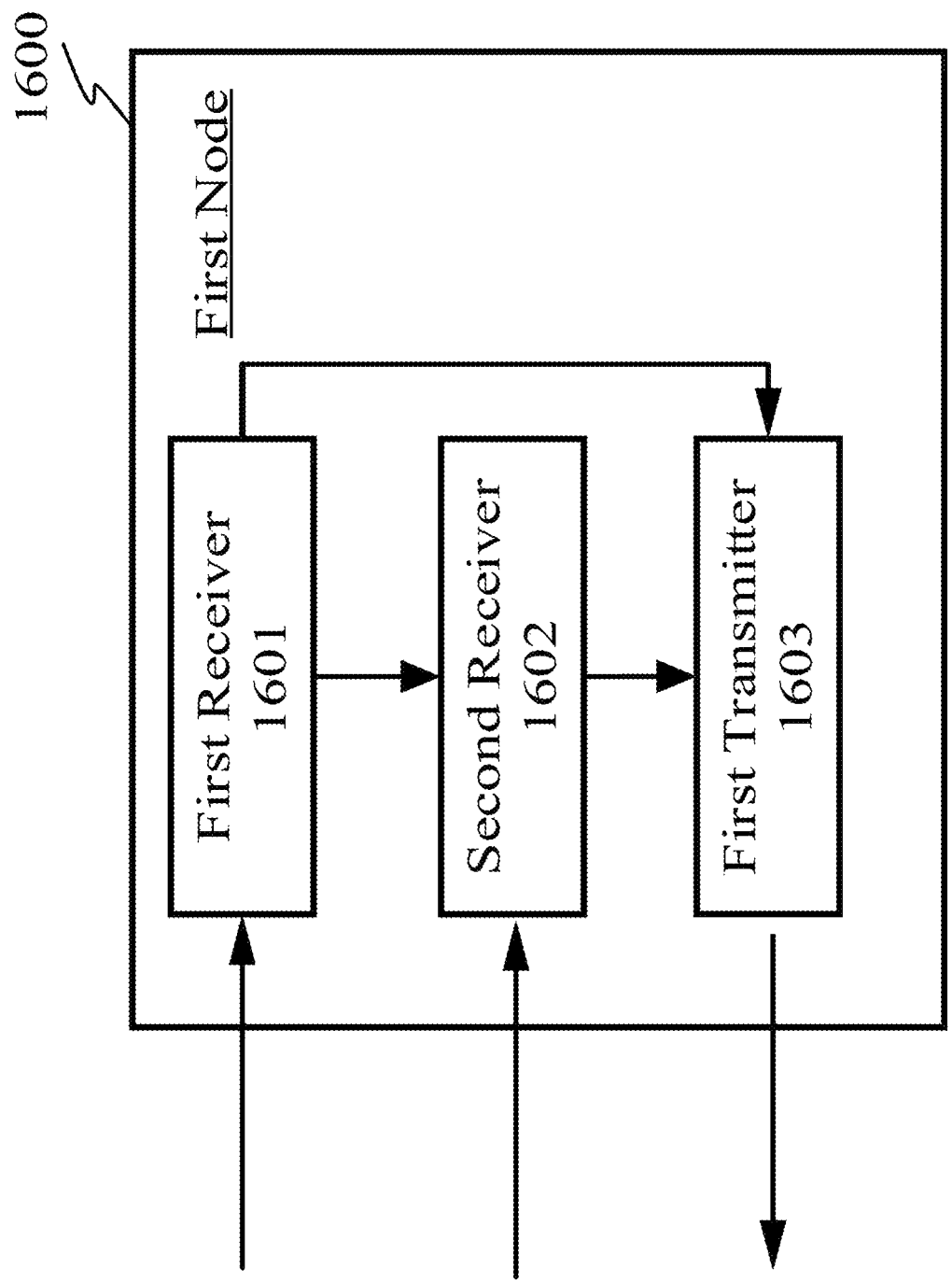
FIG. 16 illustrates a structure block diagram of a processing device in a first node according to one embodiment of the present disclosure.

Embodiment 15 illustrates a schematic diagram of a time-frequency resource unit according to one embodiment of the present disclosure, as shown in FIG. 15. In FIG. 15, a dotted small box represents a Resource Element (RE), and a bold box represents a time-frequency resource unit. In FIG. 15, a time-frequency resource unit occupies K subcarrier(s) in frequency domain, and L multicarrier symbol(s) in time domain, K and L being positive integers. In FIG. 15, $t_1$, $t_2, \ldots, t_L$ represent(s) the L symbol(s), and $f_1, f_2, \ldots, f_K$ represent(s) the K subcarrier(s).

In Embodiment 15, a time-frequency resource unit occupies the K subcarrier(s) in frequency domain and the L multicarrier symbol(s) in time domain, the K and the L being positive integers.

In one embodiment, the K is equal to 12.

In one embodiment, the K is equal to 72.

In one embodiment, the K is equal to 127.

In one embodiment, the K is equal to 240.

In one embodiment, the L is equal to 1.

In one embodiment, the L is equal to 2.

In one embodiment, the L is not greater than 14.

In one embodiment, any of the L multicarrier symbol(s) is an OFDM symbol.

In one embodiment, any of the L multicarrier symbol(s) is a SC-FDMA symbol.

In one embodiment, any of the L multicarrier symbol(s) is a DFT-S-OFDM symbol.

In one embodiment, any of the L multicarrier symbol(s) is a Frequency Division Multiple Access (FDMA) symbol.

In one embodiment, any of the L multicarrier symbol(s) is a Filter Bank Multicarrier (FBMC) symbol.

In one embodiment, any of the L multicarrier symbol(s) is an Interleaved Frequency Division Multiple Access (IF-DMA) symbol.

In one embodiment, the time-domain-resource unit comprises a positive integer number of radio frame(s).

In one embodiment, the time-domain-resource unit comprises a positive integer number of subframe(s).

In one embodiment, the time-domain-resource unit comprises a positive integer number of slot(s).

In one embodiment, the time-domain-resource unit is a slot.

In one embodiment, the time-domain-resource unit comprises a positive integer number of multicarrier symbol(s).

In one embodiment, the frequency-domain resource unit comprises a positive integer number of carrier(s).

In one embodiment, the frequency-domain resource unit comprises a positive integer number of Bandwidth Part(s) (BWP).

In one embodiment, the frequency-domain resource unit is a BWP.

In one embodiment, the frequency-domain resource unit comprises a positive integer number of subchannel(s).

In one embodiment, the frequency-domain resource unit is a subchannel.

In one embodiment, any of the positive integer number of subchannel(s) comprises a positive integer number of Resource Block(s)(RB).

In one embodiment, the one subchannel comprises a positive integer number of RB(s).

In one embodiment, any of the positive integer number of RB(s) comprises a positive integer number of sub-carrier(s) in frequency domain.

In one embodiment, any of the positive integer number of RB(s) comprises 12 sub-carrier(s) in frequency domain.

In one embodiment, the sub-channel comprises a positive integer number of PRB(s).

In one embodiment, a number of PRB(s) comprised in the one subchannel is variable.

In one embodiment, any of the positive integer number of PRB(s) comprises a positive integer number of sub-carrier(s) in frequency domain.

In one embodiment, any of the positive integer number of PRB(s) comprises 12 subcarriers in frequency domain.

In one embodiment, the frequency-domain resource unit comprises a positive integer number of RB(s).

In one embodiment, the frequency-domain resource unit is an RB.

In one embodiment, the frequency-domain resource unit comprises a positive integer number of PRB(s).

In one embodiment, the frequency-domain resource unit is a PRB.

In one embodiment, the frequency-domain resource unit comprises a positive integer number of subcarrier(s).

In one embodiment, the frequency-domain resource unit is a subcarrier.

In one embodiment, the time-frequency resource unit comprises the time-domain-resource unit.

In one embodiment, the time-frequency resource unit comprises the frequency-domain resource unit.

In one embodiment, the time-frequency resource unit comprises the time-domain-resource unit and the frequency-domain resource unit.

In one embodiment, the time-frequency resource unit comprises R RE(s), R being a positive integer.

In one embodiment, the time-frequency resource unit consists of R RE(s), R being a positive integer.

In one embodiment, any of the R RE(s) occupies a multicarrier symbol in time domain and a subcarrier in frequency domain.

In one embodiment, the one subcarrier spacing is measured by Hertz (Hz).

In one embodiment, the one subcarrier spacing is measured by Kilohertz (kHz).

In one embodiment, the one subcarrier spacing is measured by Megahertz (MHz).

In one embodiment, a symbol length of the one multicarrier symbol is measured by sampling point.

In one embodiment, a symbol length of the one multicarrier symbol is measured by microsecond (μs).

In one embodiment, a symbol length of the one multicarrier symbol is measured by millisecond (ms).

In one embodiment, the one subcarrier spacing is at least one of 1.25 khz, 2.5 KHz, 5 KHz, 15 KHz, 30 kHz, 60 KHZ, 120 kHz or 240 khz.

In one embodiment, the time-frequency resource unit comprises the K subcarrier(s) and the L multicarrier symbol(s), a product of the K and the L being not less than the R.

In one embodiment, the time-frequency resource unit does not comprise an RE allocated to a Guard Period (GP).

In one embodiment, the time-frequency resource unit does not comprise an RE allocated to a Reference Signal (RS).

In one embodiment, the time-frequency resource unit comprises a positive integer number of RB(s).

In one embodiment, the time-frequency resource unit belongs to an RB.

In one embodiment, the time-frequency resource unit is equal to an RB in frequency domain.

In one embodiment, the time-frequency resource unit comprises 6 RBs in frequency domain.

In one embodiment, the time-frequency resource unit comprises 20 RBs in frequency domain.

In one embodiment, the time-frequency resource unit comprises a positive integer number of PRB(s).

In one embodiment, the time-frequency resource unit belongs to a PRB.

In one embodiment, the time-frequency resource unit is equal to a PRB in frequency domain.

In one embodiment, the time-frequency resource unit comprises a positive integer number of Virtual Resource Block(s) (VRB).

In one embodiment, the time-frequency resource unit belongs to a VRB.

In one embodiment, the time-frequency resource unit is equal to a VRB in frequency domain.

In one embodiment, the time-frequency resource unit comprises a positive integer number of Physical Resource Block (PRB) pair(s)

In one embodiment, the time-frequency resource unit belongs to a PRB pair.

In one embodiment, the time-frequency resource unit is equal to a PRB pair in frequency domain.

In one embodiment, the time-frequency resource unit comprises a positive integer number of radio frame(s).

In one embodiment, the time-frequency resource unit belongs to a radio frame.

In one embodiment, the time-frequency resource unit is equal to a radio frame in time domain.

In one embodiment, the time-frequency resource unit comprises a positive integer number of subframe(s).

In one embodiment, the time-frequency resource unit belongs to a subframe.

In one embodiment, the time-frequency resource unit is equal to a subframe in time domain.

In one embodiment, the time-frequency resource unit comprises a positive integer number of slot(s).

In one embodiment, the time-frequency resource unit belongs to a slot.

In one embodiment, the time-frequency resource unit is equal to a slot in time domain.

In one embodiment, the time-frequency resource unit comprises a positive integer number of Symbol(s).

In one embodiment, the time-frequency resource unit belongs to a Symbol.

In one embodiment, the time-frequency resource unit is equal to a Symbol in time domain.

In one embodiment, the duration of the time-domain-resource unit in the present disclosure is equal to that of the time-frequency resource unit in time domain in the present disclosure.

In one embodiment, a number of subcarriers occupied by the frequency-domain resource unit in the present disclosure is equal to that of the time-frequency resource unit in frequency domain in the present disclosure.

Embodiment 16

Embodiment 16 illustrates a structural block diagram of a processing device used in a first node, as shown in FIG. 15. In Embodiment 16, a first node processing device 1600 mainly consists of a first receiver 1601, a second receiver 1602 and a first transmitter 1603.

In one embodiment, the first receiver 1601 comprises at least one of an antenna 452, a transmitter/receiver 454, a multi-antenna receiving processor 458, a receiving processor 456, a controller/processor 459, a memory 460 or a data source 467 in FIG. 4 of the present disclosure.

In one embodiment, the second receiver 1602 comprises at least one of an antenna 452, a transmitter/receiver 454, a multi-antenna receiving processor 458, a receiving processor 456, a controller/processor 459, a memory 460 or a data source 467 in FIG. 4 of the present disclosure.

In one embodiment, the first transmitter 1603 comprises at least one of an antenna 452, a transmitter/receiver 454, a multi-antenna transmitting processor 457, a transmitting processor 468, a controller/processor 459, a memory 460, or a data source 467 in FIG. 4 of the present disclosure.

In Embodiment 16, the first receiver 1601 receives first information, the first information being used to indicate a first time-unit format; the second receiver 1602 determines second information; the second receiver 1602 determines a first resource pool; herein, a first time window comprises Q first-type time-domain-resource blocks, the Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first time-unit format is used for indicating whether the first symbol is a first-type symbol; the second information is used for indicating a positive integer number of first-type time-domain-resource block(s) out of a first time-domain-resource-block subset, the first time-domain-resource-block subset comprises a positive integer number of first-type time-domain-resource block(s) among the Q first-type time-domain-resource blocks; the first resource pool comprises a positive integer number of first-type time-domain-resource block(s) among the first time-domain-resource-block subset in time domain, and the first time-unit format and the second information are jointly used for determining the first resource pool.

In one embodiment, the second receiver 1602 determines whether a first candidate time-domain-resource block belongs to the first time-domain-resource-block subset; the first candidate time-domain-resource block is one of the Q first-type time-domain-resource blocks; the first time-unit format is used for determining whether the first candidate time-domain-resource block belongs to the first time-domain-resource-block subset.

In one embodiment, a time-unit-format list comprises a positive integer number of first-type time-unit format(s), the first time-unit format is a first-type time-unit format among the time-unit-format list, and a time-unit-format subset comprises a positive integer number of first-type time-unit format(s) among the time-unit-format list; when the first time-unit format belongs to the time-unit-format subset, the first candidate time-domain-resource block does not belong to the first time-domain-resource-block subset.

In one embodiment, the first time-unit format is used for indicating X1 multicarrier symbol(s) comprised in the first candidate time-domain-resource block, the X1 multicarrier symbols all being the first-type symbols, the X1 being a non-negative integer; when the X1 is less than a first threshold, the first candidate time-domain-resource block does not belong to the first time-domain-resource-block subset.

In one embodiment, the second receiver 1602 determines whether the first candidate time-domain-resource block belongs to the first resource pool; the first candidate time-domain-resource block belongs to the first time-domain-resource-block subset; the second information comprises a first bit, which corresponds to the first candidate time-domain-resource block and is used for determining whether the first candidate time-domain-resource block belongs to the first resource pool.

In one embodiment, the second receiver 1602 determines whether a second candidate time-domain-resource block belongs to the first resource pool; the second candidate time-domain-resource block is a first-type time-domain-resource block among the first time-domain-resource-block subset; the second information comprises a second bit, which corresponds to the second candidate time-domain-resource block; the first time-unit format is used for indicating X2 multicarrier symbol(s) comprised in the second candidate time-domain-resource block, the X2 multicarrier symbol(s) all being the first-type symbol(s), X2 being a non-negative integer; when the value of the second bit is a first value and the X2 is not less than the first threshold, the second candidate time-domain-resource block belongs to the first resource pool.

In one embodiment, the second receiver 1602 determines whether a second candidate time-domain-resource block belongs to the first resource pool; the second candidate time-domain-resource block is a first-type time-domain-resource block among the first time-domain-resource-block subset; the second information comprises a second bit, which corresponds to the second candidate time-domain-resource block; a time-unit-format list comprises a positive integer number of first-type time-unit format(s), the first time-unit format is a first-type time-unit format among the time-unit-format list, and a time-unit-format subset comprises a positive integer number of first-type time-unit format(s) among the time-unit-format list; when a value of the second bit is a first value and the first time-unit format does not belong to the time-unit-format subset, the second candidate time-domain-resource block belongs to the first resource pool.

In one embodiment, the first transmitter 1603 determines a first time-frequency-resource block in the first resource pool; the first transmitter 1603 transmits a first signal in the first time-frequency-resource block; the first resource pool comprises the first time-domain-resource block.

In one embodiment, the first node 1600 is a UE.
In one embodiment, the first node 1600 is a relay node.
In one embodiment, the first node 1600 is a base station.
In one embodiment, the first node 1600 is a vehicle-mounted communication device.
In one embodiment, the first node 1600 is a UE supporting V2X communications.
In one embodiment, the first node 1600 is a relay node supporting V2X communications.

Embodiment 17

Figure 17:
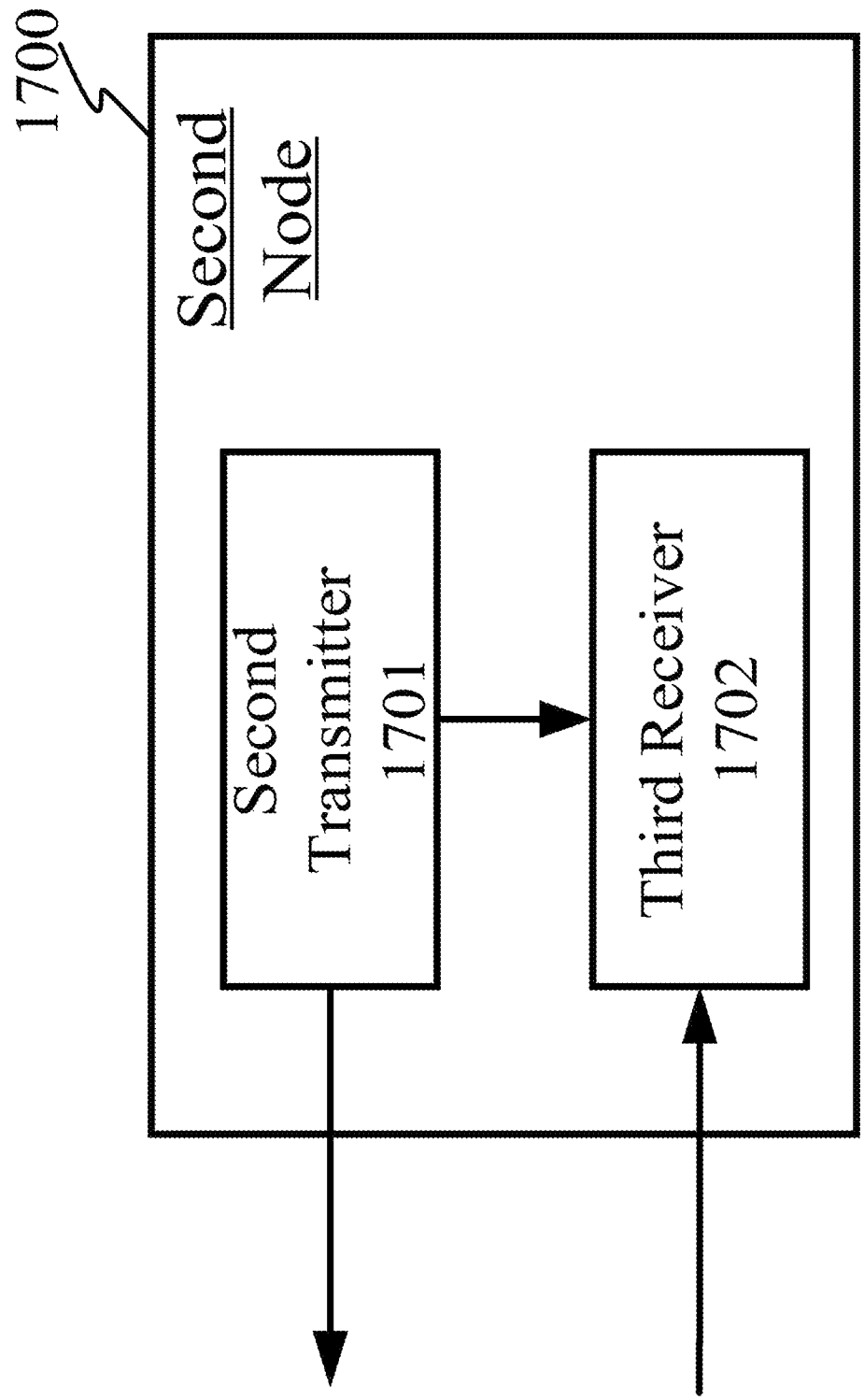
FIG. 17 illustrates a structure block diagram of a processing device in a second node according to one embodiment of the present disclosure.

Embodiment 17 illustrates a structural block diagram of a processing device used in a second node, as shown in FIG. 17. In FIG. 17, a second node processing device 1700 mainly consists of a second transmitter 1701 and a third receiver 1702.

In one embodiment, the second transmitter 1701 comprises at least one of an antenna 420, a transmitter/receiver 418, a multi-antenna transmitting processor 471, a transmitting processor 416, a controller/processor 475 or a memory 476 in FIG. 4 of the present disclosure.

In one embodiment, the third receiver 1702 comprises at least one of an antenna 420, a transmitter/receiver 418, a multi-antenna receiving processor 472, a receiving processor 470, a controller/processor 475 or a memory 476 in FIG. 4 of the present disclosure.

In Embodiment 17, the second transmitter 1701 transmits first information, the first information being used to indicate a first time-unit format; herein, a first time window comprises Q first-type time-domain-resource blocks, the Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first time-unit format is used for indicating whether the first symbol is a first-type symbol; the second information is determined by a receiver of the first information, and the second information is used for indicating a positive integer number of first-type time-domain-resource block(s) out of a first time-domain-resource-block subset; the first time-domain-resource-block subset comprises a positive integer number of first-type time-domain-resource block(s) among the Q first-type time-domain-resource blocks; a first resource pool comprises a positive integer number of first-type time-domain-resource block(s) among the first time-domain-resource-block subset in time domain, and the first time-unit format and the second information are jointly used for determining the first resource pool.

In one embodiment, a first candidate time-domain-resource block is one of the Q first-type time-domain-resource blocks; the first time-unit format is used for determining whether the first candidate time-domain-resource block belongs to the first time-domain-resource-block subset.

In one embodiment, a time-unit-format list comprises a positive integer number of first-type time-unit format(s), the first time-unit format is a first-type time-unit format among the time-unit-format list, and a time-unit-format subset comprises a positive integer number of first-type time-unit format(s) among the time-unit-format list; when the first time-unit format belongs to the time-unit-format subset, the first candidate time-domain-resource block does not belong to the first time-domain-resource-block subset.

In one embodiment, the first time-unit format is used for indicating X1 multicarrier symbol(s) comprised in the first candidate time-domain-resource block, the X1 multicarrier symbol(s) all being the first-type symbol(s), the X1 being a non-negative integer; when the X1 is less than a first threshold, the first candidate time-domain-resource block does not belong to the first time-domain-resource-block subset.

In one embodiment, the first candidate time-domain-resource block belongs to the first time-domain-resource-block subset; the second information comprises a first bit, which corresponds to the first candidate time-domain-resource block and is used for determining whether the first candidate time-domain-resource block belongs to the first resource pool.

In one embodiment, a second candidate time-domain-resource block is a first-type time-domain-resource block among the first time-domain-resource-block subset; the second information comprises a second bit, which corresponds to the second candidate time-domain-resource block; the first time-unit format is used for indicating X2 multicarrier symbol(s) comprised in the second candidate time-domain-resource block, the X2 multicarrier symbol(s) all being the first-type symbol(s), X2 being a non-negative integer; when a value of the second bit is a first value and the X2 is not less than the first threshold, the second candidate time-domain-resource block belongs to the first resource pool.

In one embodiment, a second candidate time-domain-resource block is a first-type time-domain-resource block among the first time-domain-resource-block subset; the second information comprises a second bit, which corresponds to the second candidate time-domain-resource block; a time-unit-format list comprises a positive integer number of first-type time-unit format(s), the first time-unit format is a first-type time-unit format in the time-unit-format list, and a time-unit-format subset comprises a positive integer number of first-type time-unit format(s) in the time-unit-format list; when a value of the second bit is a first value and the first time-unit format does not belong to the time-unit-format subset, the second candidate time-domain-resource block belongs to the first resource pool.

In one embodiment, the third receiver 1702 receives a first signal on the first time-frequency-resource block; the first resource pool comprises the first time-domain-resource block.

In one embodiment, the second node 1700 is a UE.

In one embodiment, the second node 1700 is a base station.

In one embodiment, the second node 1700 is a relay node.

In one embodiment, the second node 1700 is a UE supporting V2X communications.

In one embodiment, the second node 1700 is a base station supporting V2X communications.

In one embodiment, the second node 1700 is a relay node supporting V2X communications.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communications, comprising:

receiving first information, the first information being used to indicate a first time-unit format;

determining second information; and determining whether a first candidate time-domain-resource block belongs to a first time-domain-resource-block subset and determining a first resource pool;

wherein a first time window comprises Q first-type time-domain-resource blocks, Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first time-unit format is used for indicating whether the first symbol is a first-type symbol; the second information is used for indicating a positive integer number of first-type time-domain-resource block(s) out of the first time-domain-resource-block subset, and the first time-domain-resource-block subset comprises a positive integer number of first-type time-domain-resource block(s) among the Q first-type time-domain-resource blocks; the first resource pool comprises a positive integer number of first-type time-domain-resource block(s) among the first time-domain-resource-block subset in time domain, and the first time-unit format and the second information are jointly used for determining the first resource pool; wherein the first candidate time-domain-resource block is one of the Q first-type time-domain-resource blocks; the first time-unit format is used for determining whether the first candidate time-domain-resource block belongs to the first time-domain-resource-block subset a time-unit-format list comprises a positive integer number of first-type time-unit format(s), the first time-unit format is a first-type time-unit format among the time-unit-format list, and a time-unit-format subset comprises a positive integer number of first-type time-unit format(s) among the time-unit-format list when the first time-unit format belongs to the time-unit-format subset, the first candidate time-domain-resource block does not belong to the first time-domain-resource-block subset;

or, the first time-unit format is used for indicating X1 multicarrier symbol(s) comprised in the first candidate time-domain-resource block, the X1 multicarrier symbol(s) all being the first-type symbol(s), the X1 being a non-negative integer; when the X1 is less than a first threshold, the first candidate time-domain-resource block does not belong to the first time-domain-resource-block subset.

2. The method according to claim 1, comprising:

determining whether the first candidate time-domain-resource block belongs to the first resource pool;

wherein the first candidate time-domain-resource block belongs to the first time-domain-resource-block subset; the second information comprises a first bit, which corresponds to the first candidate time-domain-resource block and is used for determining whether the first candidate time-domain-resource block belongs to the first resource pool.

3. The method according to claim 2, comprising:

determining a first time-frequency-resource block in the first resource pool;

transmitting a first signal in the first time-frequency-resource block;

wherein the first resource pool comprises the first time-frequency-resource block.

4. The method according to claim 1, comprising:

determining whether a second candidate time-domain-resource block belongs to the first resource pool;

wherein the second candidate time-domain-resource block is a first-type time-domain-resource block among the first time-domain-resource-block subset; the second information comprises a second bit, which corresponds to the second candidate time-domain-resource block; the first time-unit format is used for indicating X2 multicarrier symbol(s) comprised in the second candidate time-domain-resource block, the X2 multicarrier symbol(s) all being the first-type symbol (s), X2 being a non-negative integer; when a value of the second bit is a first value and the X2 is not less than a first threshold, the second candidate time-domain-resource block belongs to the first resource pool;

or, a time-unit-format list comprises a positive integer number of first-type time-unit format(s), the first time-unit format is a first-type time-unit format among the time-unit-format list, and a time-unit-format subset comprises a positive integer number of first-type time-unit format(s) among the time-unit-format list; when a value of the second bit is a first value and the first time-unit format does not belong to the time-unit-format subset, the second candidate time-domain-resource block belongs to the first resource pool.

5. A method in a second node for wireless communications, comprising:

transmitting first information, the first information being used to indicate a first time-unit format;

wherein a first time window comprises Q first-type time-domain-resource blocks, Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first time-unit format is used for indicating whether the first symbol is a first-type symbol; second information is determined by a receiver of the first information, and the second information is used for indicating a positive integer number of first-type time-domain-resource block(s) out of a first time-domain-resource-block subset; the first time-domain-resource-block subset comprises a positive integer number of first-type time-domain-resource block(s) among the Q first-type time-domain-resource blocks; a first resource pool comprises a positive integer number of first-type time-domain-resource block(s) among the first time-domain-resource-block subset in time domain, and the first time-unit format and the second information are jointly used for determining the first resource pool; a first candidate time-domain-resource block is one of the Q first-type time-domain-resource blocks; the first time-unit format is used for determining whether the first candidate time-domain-resource block belongs to the first time-domain-resource-block subset;

a time-unit-format list comprises a positive integer number of first-type time-unit format(s), the first time-unit format is a first-type time-unit format among the time-unit-format list, and a time-unit-format subset comprises a positive integer number of first-type time-unit format(s) among the time-unit-format list when the first time-unit format belongs to the time-unit-format subset, the first candidate time-domain-resource block does not belong to the first time-domain-resource-block subset when the first time-unit format does not belong to the time-unit-format subset, the first candidate time-domain-resource block belongs to the first time-domain-resource-block subset;

or, the first time-unit format is used for indicating X1 multicarrier symbol(s) comprised in the first candidate time-domain-resource block, the X1 multicarrier symbol(s) all being the first-type symbol(s), the X1 being a non-negative integer; when the X1 is less than a first threshold, the first candidate time-domain-resource block does not belong to the first time-domain-resource-block subset when the X1 is greater than a first threshold, the first candidate time-domain-resource block belongs to the first time-domain-resource-block subset;

when the first candidate time-domain-resource block belongs to the first time-domain-resource-block subset, the second information comprises a first bit, which corresponds to the first candidate time-domain-resource block and is used for determining whether the first candidate time-domain-resource block belongs to the first resource pool.

6. The method according to claim 5, comprising:
receiving a first signal on a first time-frequency-resource block;
wherein the first resource pool comprises the first time-frequency-resource block.

7. A first node for wireless communications, comprising:
a first receiver, receiving first information, the first information being used to indicate a first time-unit format;
a second receiver, determining second information; and
the second receiver, determining whether a first candidate time-domain-resource block belongs to the first time-domain-resource-block subset and determining a first resource pool;
wherein a first time window comprises Q first-type time-domain-resource blocks, Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first time-unit format is used for indicating whether the first symbol is a first-type symbol; the second information is used for indicating a positive integer number of first-type time-domain-resource block(s) out of a first time-domain-resource-block subset, the first time-domain-resource-block subset comprises a positive integer number of first-type time-domain-resource block(s) among the Q first-type time-domain-resource blocks; the first resource pool comprises a positive integer number of first-type time-domain-resource block(s) among the first time-domain-resource-block subset in time domain, and the first time-unit format and the second information are jointly used for determining the first resource pool; wherein the first candidate time-domain-resource block is one of the Q first-type time-domain-resource blocks; the first time-unit format is used for determining whether the first candidate time-domain-resource block belongs to the first time-domain-resource-block subset a time-unit-format list comprises a positive integer number of first-type time-unit format(s), the first time-unit format is a first-type time-unit format among the time-unit-format list, and a time-unit-format subset comprises a positive integer number of first-type time-unit format(s) among the time-unit-format list when the first time-unit format belongs to the time-unit-format subset, the first candidate time-domain-resource block does not belong to the first time-domain-resource-block subset or, the first time-unit format is used for indicating X1 multicarrier symbol(s) comprised in the first candidate time-domain-resource block, the X1 multicarrier symbol(s) all being the first-type symbol(s), the X1 being a non-negative integer; when the X1 is less than a first threshold, the first candidate time-domain-resource block does not belong to the first time-domain-resource-block subset.

8. The first node according to claim 7, comprising:
the second receiver, determining whether the first candidate time-domain-resource block belongs to the first resource pool;
wherein the first candidate time-domain-resource block belongs to the first time-domain-resource-block subset; the second information comprises a first bit, which corresponds to the first candidate time-domain-resource block and is used for determining whether the first candidate time-domain-resource block belongs to the first resource pool.

9. The first node according to claim 8, comprising:
a first transmitter, determining a first time-frequency-resource block in the first resource pool;
the first transmitter, transmitting a first signal on the first time-frequency-resource block;
wherein the first resource pool comprises the first time-frequency-resource block.

10. The first node according to claim 7, comprising:
the second receiver, determining whether a second candidate time-domain-resource block belongs to the first resource pool;
wherein the second candidate time-domain-resource block is a first-type time-domain-resource block among the first time-domain-resource-block subset; the second information comprises a second bit, which corresponds to the second candidate time-domain-resource block; the first time-unit format is used for indicating X2 multicarrier symbol(s) comprised in the second candidate time-domain-resource block, the X2 multicarrier symbol(s) all being the first-type symbol(s), X2 being a non-negative integer; when a value of the second bit is a first value and the X2 is not less than a first threshold, the second candidate time-domain-resource block belongs to the first resource pool.

11. The first node according to claim 7, comprising:
the second receiver, determining whether a second candidate time-domain-resource block belongs to the first resource pool;
wherein the second candidate time-domain-resource block is a first-type time-domain-resource block among the first time-domain-resource-block subset; the second information comprises a second bit, which corresponds to the second candidate time-domain-resource block; a time-unit-format list comprises a positive integer number of first-type time-unit format(s), the first time-unit format is a first-type time-unit format among the time-unit-format list, and a time-unit-format subset comprises a positive integer number of first-type time-unit format(s) in the time-unit-format list; when a value of the second bit is a first value and the first time-unit format does not belong to the time-unit-format subset, the second candidate time-domain-resource block belongs to the first resource pool.

12. A second node for wireless communications, comprising:
a second transmitter, transmitting first information, the first information being used to indicate a first time-unit format;
wherein a first time window comprises Q first-type time-domain-resource blocks, Q being a positive integer greater than 1; any of the Q first-type time-domain-resource blocks comprises a positive integer number of multicarrier symbol(s); a first symbol is one of the positive integer number of multicarrier symbol(s) comprised in any of the Q first-type time-domain-resource blocks; the first time-unit format is used for indicating whether the first symbol is a first-type symbol; second information is determined by a receiver of the first information, and the second information is used for indicating a positive integer number of first-type time-domain-resource block(s) out of a first time-domain-resource-block subset; the first time-domain-resource-block subset comprises a positive integer number of first-type time-domain-resource block(s) among the Q first-type time-domain-resource blocks; a first resource pool comprises a positive integer number of first-type time-domain-resource block(s) among the first time-domain-resource-block subset in time domain, and the first time-unit format and the second information are jointly used for determining the first resource pool; a first candidate time-domain-resource block is one of the Q first-type time-domain-resource blocks; the first time-unit format is used for determining whether the first candidate time-domain-resource block belongs to the first time-domain-resource-block subset;
a time-unit-format list comprises a positive integer number of first-type time-unit format(s), the first time-unit format is a first-type time-unit format among the time-unit-format list, and a time-unit-format subset comprises a positive integer number of first-type time-unit format(s) among the time-unit-format list when the first time-unit format belongs to the time-unit-format subset, the first candidate time-domain-resource block does not belong to the first time-domain-resource-block subset when the first time-unit format does not belong to the time-unit-format subset, the first candidate time-domain-resource block belongs to the first time-domain-resource-block subset;
or, the first time-unit format is used for indicating X1 multicarrier symbol(s) comprised in the first candidate time-domain-resource block, the X1 multicarrier symbol(s) all being the first-type symbol(s), the X1 being a non-negative integer; when the X1 is less than a first threshold, the first candidate time-domain-resource block does not belong to the first time-domain-resource-block subset when the X1 is greater than a first threshold, the first candidate time-domain-resource block belongs to the first time-domain-resource-block subset;
when the first candidate time-domain-resource block belongs to the first time-domain-resource-block subset, the second information comprises a first bit, which corresponds to the first candidate time-domain-resource block and is used for determining whether the first candidate time-domain-resource block belongs to the first resource pool.

13. The second node according to claim 12, comprising:
a second candidate time-domain-resource block is a first-type time-domain-resource block among the first time-domain-resource-block subset; the second information comprises a second bit, which corresponds to the second candidate time-domain-resource block;
the first time-unit format is used for indicating X2 multicarrier symbol(s) comprised in the second candidate time-domain-resource block, the X2 multicarrier symbol(s) all being the first-type symbol(s), X2 being a non-negative integer; when a value of the second bit is a first value and the X2 is not less than a first threshold, the second candidate time-domain-resource block belongs to the first resource pool;
or, a time-unit-format list comprises a positive integer number of first-type time-unit format(s), the first time-unit format is a first-type time-unit format among the time-unit-format list, and a time-unit-format subset comprises a positive integer number of first-type time-unit format(s) among the time-unit-format list; when a value of the second bit is a first value and the first time-unit format does not belong to the time-unit-format subset, the second candidate time-domain-resource block belongs to the first resource pool.

14. The second node according to claim 12, comprising:
receiving a first signal on a first time-frequency-resource block;
wherein the first resource pool comprises the first time-frequency-resource block.

* * * * *